(12) United States Patent
Huntsman et al.

(10) Patent No.: US 11,051,230 B2
(45) Date of Patent: Jun. 29, 2021

(54) WIRELESS RESILIENT ROUTING RECONFIGURATION LINEAR PROGRAM

(71) Applicant: BAE Systems Information and Electronic Systems Integration Inc., Nashua, NH (US)

(72) Inventors: Steven C. Huntsman, Alexandria, VA (US); Brian T. Decleene, North Reading, MA (US); Jeong-O Jeong, Ashburn, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 125 days.

(21) Appl. No.: 16/463,100

(22) PCT Filed: Aug. 22, 2018

(86) PCT No.: PCT/US2018/047456
§ 371 (c)(1),
(2) Date: May 22, 2019

(87) PCT Pub. No.: WO2020/040755
PCT Pub. Date: Feb. 27, 2020

(65) Prior Publication Data
US 2020/0413321 A1    Dec. 31, 2020

(51) Int. Cl.
*H04W 40/30*    (2009.01)
*H04L 12/761*    (2013.01)
*H04L 12/707*    (2013.01)
*H04W 40/34*    (2009.01)

(52) U.S. Cl.
CPC ............. *H04W 40/30* (2013.01); *H04L 45/16* (2013.01); *H04L 45/22* (2013.01); *H04W 40/34* (2013.01)

(58) Field of Classification Search
None
See application file for complete search history.

(56) References Cited

U.S. PATENT DOCUMENTS 6,236,908 B1    5/2001    Chen et al.
7,606,817 B2   10/2009    Carter
(Continued)

OTHER PUBLICATIONS

International Search Report, PCT/US18/61025, 15 pages, dated Oct. 19, 2018.
(Continued)

*Primary Examiner* — Brian S Roberts
(74) *Attorney, Agent, or Firm* — Scott J. Asmus; Sand, Sebolt & Wernow LPA

(57) ABSTRACT

A method and system for a Wireless Resilient Routing Reconfiguration linear program or protocol (WR3LP). The WR3LP provides a routing protection scheme that is (i) congestion-free or reduced congestion under a wide range of failure scenarios in point-to-multipoint networks, (ii) efficient in terms of router processing overhead and memory requirement in wireless and point-to-multipoint networks, (iii) flexible in accommodating diverse performance requirements in wireless and point-to-multipoint networks (e.g., different traffic protection levels), and (iv) robust to traffic variations and topology failures in wireless and point-to-multipoint networks.

12 Claims, 9 Drawing Sheets

(56) References Cited

U.S. PATENT DOCUMENTS

| | | | | |
|---|---|---|---|---|
| 8,477,597 | B2* | 7/2013 | Zhang | H04L 45/02 370/217 |
| 9,602,351 | B2* | 3/2017 | Mahajan | H04L 41/145 |
| 2007/0160020 | A1* | 7/2007 | Osann | H04W 40/02 370/338 |
| 2007/0206548 | A1* | 9/2007 | Toskala | H04L 12/189 370/338 |
| 2011/0228769 | A1* | 9/2011 | Haimi-Cohen | H04L 12/18 370/390 |
| 2012/0102116 | A1* | 4/2012 | Shi | H04L 67/1091 709/204 |
| 2012/0155511 | A1 | 6/2012 | Shaffer et al. | |
| 2014/0006893 | A1 | 1/2014 | Shetty et al. | |
| 2015/0189467 | A1 | 7/2015 | Alsehly et al. | |
| 2016/0218946 | A1 | 7/2016 | Ellerbrock et al. | |
| 2017/0171017 | A1* | 6/2017 | Licardie | H04L 47/41 |

OTHER PUBLICATIONS

Forrest, J. (2016). Cbc (Coin-or branch and cut) [computer software]. Available from https://projects.coin-or.org/Cbc.
Jakma, P. (2015). Quagga Routing Suite. Retrieved from http://www.noognu.org/guagga/.
Kuznetsov, A. (2016). iproute2. Retrieved from https://wiki.Jinuxfoundation.org/networking/iproute2#introduction.
Lui, H. H., Kandula, S., Mahajan, R., Zhang, M., & Gelemter, D. (2014). Traffic engineering with forward fault correction. ACM SIGCOMM Computer Communication Review, 44, 527-538. doi: 10. I I 45/2740070.2626314.
Marsh, M. G. (2001). Policy Routing Book: IPROUTE2 Documentation. Retrieved from http://www.policyrouting.org/iproute2.doc.htmJ.
Page, L. The PageRank citation ranking: bringing order to the web. (1999). Retrieved from http://infolab.stanford.edu/~page/papers/pagerank/ppframe.htm.
Sanderson, C. (2016). Armadillo C++ linear algebra library [ computer software]. Available from http://arma.sourceforge.net/.
Suchara, M., Xu, D., Doverspike, R., Johnson, D., & Rexford, J. (2011). Network architecture for joint failure recovery and traffic engineering. ACM SIGMETRICS Performance Evaluation Review, 39, 97-108. doi: 10.1145/2007116.2007128.
The Naval Science and Technology (S&T) Strategic Plan, Sep. 2011. (abstract attached, log in required for access).
Distributed Common Ground System-Navy (DCGS-N) Fact Sheet, SPAW AR, Nov. 2011.
Wang, Y., Wang, H., Mahimkar, A., Alimi, R., Zhang, Y., Qiu, L., & Yang, Y. R. (2010).R3: Resilient Routing Reconfiguration. ACM SJGCOMM Computer Communications Review, 40, 291-302. doi: 10.1145/ 1851182.1851218.

* cited by examiner

WIRELESS RESILIENT ROUTING RECONFIGURATION LINEAR PROGRAM

STATEMENT OF GOVERNMENT INTEREST

This invention was made with United States Government support under Prime Contract No. N00014-15-C-5102 awarded by the United States Navy. The United States Government has certain rights in this invention.

TECHNICAL FIELD

This present disclosure relates generally to Internet Protocol (IP) network operations. More particularly, the present disclosure relates to a method and system for a wireless resilient routing reconfiguration linear program (WR3LP), a protection scheme for routing in a point-to-multipoint network that can avoid congestion and offer predictable performance under one or a series of link failures.

BACKGROUND

Background Information

It is desirable for networks to be resilient in the face of link failures. However, naive methods for generating routing protection schemes that account for congestion have complexity that grows in a combined manner with the number of failures to protect against. For example, if a network has N links and up to F link failures must be protected against, then the number of possible failure scenarios is $$\sum_{k=0}^{F} \binom{N}{k}.$$

Furthermore, planning for these scenarios should be coordinated in such a way to minimize disruptions to the traffic pattern when new failures occur.

Both of these issues make it clear that optimizing traffic routing with respect to individual failure scenarios is an inadequate basis for a traffic engineering strategy. The challenge presented in using resilient routing reconfiguration (R3), a congestion-avoiding routing reconfiguration framework that is resilient under multiple failures.

R3 accounts for all possible failure scenarios within a single optimization problem by adding "virtual" traffic corresponding to the capacity of links that might fail. This converts uncertainty in network topology into uncertainty in traffic. An offline configuration step is performed in which a base routing r that optimizes maximum link utilization is solved for, along with a protection routing p that encodes detours in the presence of link failures. As links fail, an online reconfiguration step is performed in which r and p are updated using a handful of simple arithmetic operations and traffic is rerouted accordingly. Because the update operations are so network losses and latency are minimized. Meanwhile, in the background a link monitor can continuously check the current network connectivity and utilize a solver to determine the optimal base and protection routings to replace the near-optimal updates as network stability permits.

R3 enjoys several theoretical guarantees regarding congestion avoidance, optimality, and the order of link failures. Perhaps more importantly, it is also efficient in practice, where the theoretical requirements for these guarantees do not typically hold. For example, a single node on the network edge may be isolated with fewer than F failures, but the traffic pattern that R3 generates will not be adversely affected by this degeneracy. Proactive alternatives to R3 have been proposed however, previous attempts rely on predicted traffic demand adds an element of uncertainty that R3 avoids. Furthermore, these alternatives do not offer the theoretical guarantees of R3.

The network can be modeled as follows. Let G=(V,E) be a directed multigraph modeling the network topology in which the nodes V are network routers and the edges E are directed links between the routers. It will be convenient to write $s(\ell)$ and $t(\ell)$ respectively for the source and target (or tail) of a link $\ell$. The link capacity is modeled as a function c: E→[0,∞) and the traffic demand is modeled as a function d: V×V→[0,∞). If a, b∈V and $\ell$∈E, then the value $r_{ab}(\ell)$ of a base routing r specifies the fraction of traffic with origin a and destination b that traverses the link $\ell$. Thus the total amount of traffic on link $\ell$ is $\Sigma_{ab\in V} d_{ab}r_{ab}(\ell)$, where $d_{ab}$ is the demand from a to b. In this example, traffic takes two separate paths (link parallelism). The values are roughly as follows: $r_{ab}$(Node 1 to node 3)=1, $r_{ab}$(Node 2 to node 3)=½, etc.

More generally, a routing as any function p from V×V×E to [0,1] that satisfies the following constraints:

$$\sum_{e:s(e)=j} \rho_{ab}(e) = \sum_{e':t(e')=j} \rho_{ab}(e'),$$

a, b, and j distinct (with j not a source or sink of G itself), $$\sum_{e:s(e)=a} \rho_{ab}(e) = 1,$$

a≠b and a also not a sink of G itself,
$\rho_{ab}(e)$=0, a≠b and t(e)=a.

These constraints respectively enforce flow conservation, totality, and a prohibition on returning to the origin. In addition, the inventors worked with the constraints above and other variants in which symmetric constraints or graph reachability are also considered, but have not found these considerations to have any material effect.

In the R3 framework, the capacitated topology (V,E,c) and demand d are given along with a number F of allowed link failures. A base routing r and protection routing p are derived to ensure congestion-free traffic flow under ≤F link failure if sufficient connectivity exists to begin with, and more generally to give resilient routing in the presence of multiple link failures.

The protection routing p is itself a routing of the sort above in which origin/destination pairs are required to be of the form $(s(\ell),t(\ell))$, and it encodes weighted alternative paths from $s(\ell)$ to $t(\ell)$. Thus when link $\ell$ fails, the remaining paths from $s(\ell)$ to $t(\ell)$ can be reweighted and used in place of $\ell$. This reconfiguration (which applies to both r and p) only requires very simple arithmetic operations and can therefore be applied essentially instantaneously. Meanwhile, a background process can continuously solve for base and protection routings for the current topology and number of remaining allowed link failures to smoothly transition from optimal pre-planned routes to routes that are optimal for the actual current failures and residual possible failures.

To plan for arbitrary link failures, the virtual demand set $Z_F:=\{z: (0\leq z\leq c)\}$ is consider. Each point $x\in X_F$ corresponds to a potential load on the network that saturates no more than F links on its own. Now in principle r and p could be obtained by first requiring each to be a routing as defined above and then solving the constrained optimization problem $$\min_{r,p} \mu \text{ subject to } \sum_{a,b\in V} d_{ab}r_{ab}(e) + \sum_{l\in E} x_l p_{s(l),t(l)}(e) \leq c_e\mu, \forall x \in X_F, e \in E.$$

Recall that the first sum above is merely the total traffic on link e, and note the second sum above is the virtual traffic on link e. In other words, the optimization requires that the sum of actual and virtual traffic not exceed the link capacity times the maximum link utilization $\mu$. So long as the objective $\mu$ is less than 1, congestion-free routing is possible under $\leq F$ link failures.

In practice, the optimization problem above is not in a solvable form. However, it can be transformed into an equivalent linear program using the duality theorem. The solution time varies only indirectly with F, though for larger values more redundancy is demanded of a solution and routing performance will necessarily be affected. Thus the value of F chosen should reflect some specific planning consideration.

There are at least two theoretical subtleties in the offline configuration phase of R3 in which the base routing r and protection routing p are computed. The first of these subtleties is related to parallel links. The second is the intricate indexing required in setting up the key linear program. These are respectively tackled by a topology virtualization step that uses virtual nodes to replace parallel links (necessary for the self-consistency of the framework), and the judicious use of tensor algebra.

With those subtleties henceforth relegated to the background, as mentioned above the base and protection routings are ultimately obtained by solving a linear program obtained by applying the duality theorem to the optimization problem. For unadorned R3, this linear program is the minimization of the maximum link utilization $\mu$ over r, p, $\pi$, and $\lambda$ subject to the constraints that r and p are both routings, that u and A are both nonnegative, and that $$\sum_{a,b\in V} d_{ab}r_{ab}(e) + \sum_{l\in E} \pi_e(l) + \lambda_e F - c_e\mu \leq 0, \forall e \in E;$$

$$c_l p_{s(l),t(l)}(e) - \pi_e(l) - \lambda_e \leq 0, \forall e, l \in E.$$

The variables $\pi$ and $\lambda$ are introduced as a consequence of the transformation of the optimization problem into a linear program and are not of independent interest. Thus the meaningful parts of the solution of the linear program for R3 are the base and protection routings, along with the maximum link utilization $\mu$.

SUMMARY

Traditional R3 does not work with wireless systems because the R3 framework cannot account for multi-casting links that need to be operating in a point to point link. R3 was developed for wired network backbones; however, the present disclosure extends its approach in such a way that it can apply to tactical networks with both wired and wireless connections. In accordance with one aspect, the WR3LP of the present disclosure imposes an additional constraint that ties the capacity of a wireless transmitter to its point-to-multipoint connection that generally incorporates multiple edges. A similar constraint for wireless receivers may also be incorporated, and would have essentially the same structural features and is straightforward to add if necessary or desirable.

To accommodate point-to-multipoint transmissions, the present disclosure may provide additional constraints in the form of $$\sum_{\gamma_j(e)=g} d_{j,t(e)} r_{j,t(e)}(\sigma(e)) \leq c_j(g),$$

(i.e., the wireless constraint; discussed in greater detail below with reference to Equation 22 and Equation 23) where $\gamma_j$ is a suitable labeling of the edges with source vertex j defining "point-to-multipoint groups" that share a common capacity value and $\sigma$ is a permutation that is defined in terms of the topology virtualization.

As suggested above, some tensor algebra allows the constraints for R3 and its point-to-multipoint generalization to be represented as an explicit matrix inequality that a generic linear programming solver can easily dispatch. Much smaller linear programs can also help evaluate the maximum virtual demand on a link and thereby recapture theoretical guarantees of R3 in the presence of parallel links.

With the base routing r and protection routing p in hand, reconfiguration is straightforward. A failure of link e results in updates $r \mapsto r'$ and $p \mapsto p'$ according to $$\xi_e(l) := \begin{cases} 1 & \text{if } p_e(e) = 1 \\ \dfrac{p_e(l)}{1 - p_e(e)} & \text{otherwise,} \end{cases}$$

$$r'_{ab}(l) := r_{ab}(l) + r_{ab}(e) \cdot \xi_e(l),$$

$$p'_{(s(l'),t(l'))}(l) = p_{s(l'),t(l')}(l) + p_{s(l'),t(l')}(e) \cdot \xi_e(l)$$

for a, b$\in$V and l, l'$\neq$e. This update rule is also applied for subsequent failures and results in essentially instantaneous rerouting.

One counterintuitive feature of the reconfiguration step is that it can result in traffic loops. While loops are problematic in a tactical setting, this issue is resolved relatively quickly when base routing is recomputed, generally at a predetermined interval such as every 40 seconds. In addition, one unexplored potential method for eliminating loops is by introducing additional constraints in the linear program. Post-processing routes using a graph search algorithm may also be useful in this regard, though other techniques such as flow decomposition are inappropriate.

The present disclosure may further provide for the efficient use/configuration of heterogeneous communications technologies such that end-to-end performance of different traffic classes is maintained despite the loss of one or more individual links due to adversary threats. The present disclosure extends previous research in multi-commodity optimization and resilient networking along the following insights: (a) reformulate anticipated adversarial communication threats (i.e., jamming) and unplanned mobility as traffic uncertainty constraints rather than topology changes; (b) redefine priority as a measure of traffic certainty rather than distinct commodity classes; (c) introduce multiple-path routing and error correction to manage overall uncertainty.

When run or executed by a processor, instructions implement operations that may accomplish a method or process that generates base routing for each pairwise source-destination set. It may also generate protection routing for each link failure. Where the base routing ensures that 100% of the traffic is routed along multiple paths from the source to the destination, the protection routing defines how 100% of the traffic that would have been traversing the failed link should be rerouted. For example, the base routing for F=2 between a first node and a second node may provide that the base routing moves 57% of the traffic along a first path while the remaining 43% travels a second path. Both paths may converge on the destination ensuring that all traffic is successfully delivered.

The protection routing may route the traffic around a failed link. As more failures occur, additional links may be added to the protection routing strategy such that the traffic can be successfully delivered in the end.

The base and protection routing may be performed offline. But during a failure, the protection routing may be applied to the base routing using the update procedure for fast redirection of traffic. For example, a failure of the top link in the base routing may cause the 57% of traffic to be rerouted along the 43% path. More importantly, the applied protection routing also creates a second path exiting a third node corresponding to the protection routing of a middle panel. Also, this may be used to update the protection routing in the bottom panel such that the first path (which would be no longer valid) is not included in any subsequent corrections.

The present disclosure implements its processes in a flexible framework that facilitates the configuration of inputs, supports a wider ranges of solvers, and generates practical output formats.

Traditional R3 implementation may accept the edges vector, capacities vector, demand matrix, and a maximum number of link failures allowed as inputs. Based on those inputs, it generates a linear program which is solved by the CBC solver. The solution of the linear program consists of the base routes, virtual routes and the value of the objective function. The CBC library provides an API for easily converting the linear program into an MPS (Mathematical Programming System) file format which is accepted by many other open source and commercial linear program solvers. This allows the possibility of switching to a different solver easily if required in the future.

In accordance with one aspect of the present disclosure, one exemplary module may be referred to as a PFO-R3 module. The PFO-R3 may include or perform the steps of: 1. Build a graph representation of the network topology from Open Shortest Path First (OSPF) database; 2. Compute R3 offline configuration routes; 3. Write routes to the kernel; 4. Compute R3 online reconfiguration routes; and 5. Relay link failure notifications to neighbor PFOs.

A GraphBuilder module may query an OSPF database and constructs internal representations of the network topology. The PFO-R3 module uses the topology representation to construct input data structures such as edges vector and capacities vector, which are used by the R3LP module. The R3LP constructs a linear program based on the network topology, user-defined demand matrix and number of allowed link failures. The linear program is then solved by a solver CBC module. The PFO-R3 module takes the base routes provided by the solver CBC module's solution and converts them to iproute2 commands. The iproute2 commands are executed to write new routes to the kernel.

OSPF is a protocol widely used by the Navy. Integration with this protocol will demonstrate that PFO-R3 is compatible with an existing technology embraced by the Navy. As a result, the benefit to the Navy for adopting the PFO framework would be increased efficiently with minimal disruption to their current environment. However, other non-governmental operators would similarly benefit from this integration.

At least one instance of PFO-R3 module runs in each of the router in the network. To obtain the network topology required for the R3 algorithm, the PFO-R3 module queries the OSPF database of its router as each OSPF router has complete knowledge of its network topology. Each node in the network is then able to perform the R3 algorithm to obtain the optimal routes. Since all routers in an OSPF area have the synchronized view of the network topology, all of the PFO-R3 modules in the area compute the same routes.

Under OSPF's normal operation, new routes are written to the kernel via the Zebra daemon when the OSPF daemon re-computes the routes. However, when PFO-R3 is running, the OSPF routes must be blocked from being written to the kernel to prevent conflicts between OSPF routes and PFO-R3 routes. Thus, the Zebra daemon simply is terminated when PFO-R3 writes its own routes to the kernel. The OSPF daemon's ability to update its link-state advertisement (LSA) database is unaffected by the termination of the Zebra daemon.

OSPF normally takes as long as the OSPF's Dead Interval time, which is 40 seconds by default, to detect link failures that happen more than one-hop away. The Link Monitor module is added as a complementary way to detect link failures faster. The Link Monitor module probes the immediate neighbors using very small packets at higher frequency than OSPF does with its Hello packets so that link failures can be detected faster.

When a link failure happens, the Link Monitor module notifies the PFO R3 module of the failed links. The PFO R3 module then relays the failed link notification to its immediate neighbor PFOs, which in turn notifies their own immediate neighbor PFOs. After notifying its neighbor, the PFO R3 module performs the online reconfiguration to obtain the protection routes. The protection routes are then written to the Linux kernel. These protection routes are used until the next Dead Interval period when the offline configuration occurs with the updated view of the network.

The PFO module builds an internal representation of the network by querying the OSPF database via the vtysh command-line interface. Two types of LSA database are used to provide information on the network: Router LSA, which specifies the interfaces that are available on each router and Network LSA, which specifies the routers that are on the network. Initially, the command "show ip ospf database" is used to get a summary of all routers present in the OSPF. Next, a command "show ip ospf data router <router ip>" is used to get all the links connected to a particular router. Finally, a command "show ip ospf data network <designed router ip>" is used to get all routers that are connected to a common network. Information from these LSAs is sufficient to reconstruct the network topology and generate input data structures required for the R3 offline configuration.

The capacities of the links are obtained from the cost associated with the source interfaces of the links. The cost is converted to the capacity using the following formula $$\text{Capacity} = \frac{\text{REF\_BW\_MBPS}}{\text{Cost}}$$

where the reference bandwidth REF_BW_MBPS of 100 Mbps is used.

The output of R3 algorithm is a vector r of size $N \cdot n^2$ where N is the number of edges and n is the number of nodes. The vector r needs to be converted to iproute2 commands so that the new routes can be applied to the kernel. Policy routing must be used since the routes computed by the R3 algorithm depend not only on the destination but also on the source of the packet. Policy routing allows packets to be routed based on the source address in addition to the destination address. The following steps may be taken to write the computed routes to the kernel. 1. Flush routes added by the Zebra daemon; 2. Add route tables to an electronic database; 3. Add in rules; 4. Add ip routes to each table.

The first step is to flush existing routes added by the Zebra daemon so that there are no conflicting routes in the route table. Next, a route table per router node is created. Then, the ip rules are added to the routing policy database, so that different route tables are used depending on the source address of the packets. The source addresses of the different interfaces on the same router are assigned to the same table to account for routers that have multiple interfaces.

In contrast to OSPF routes, which uses a single route unless there is an equivalent cost path, the PFO-R3 routes allow packets traveling to the same destination to use different outgoing links. The ratio of outgoing links to use is determined by the fractional values in the routing vector r. The use of multiple outgoing links is realized by adding multiple next hops with different weight values.

For example, the following iproute2 command routes packets coming from source node 4 traveling to 10.0.4.1 via the interface eth0 30 percent of the time, via eth1 40 percent of the time, and via the interface eth4 30 percent of the time. With different weight values on the outgoing links, the R3 algorithm is able to decrease the link utilization of links by spreading out the traffic on multiple links. For this example, the ip route add table src4 10.0.4.1 \ nexthop via 10.0.0.2 dev eth0 weight 30 \ nexthop via 10.0.1.2 dev eth1 weight 40 \ nexthop via 10.0.10.2 dev eth4 weight 30 \.

A Link Monitor module may be present in every router along with the PFO-R3 module. It complements OSPF's convergence mechanism by providing faster link failure detection. At the beginning of each R3 offline configuration cycle, the Link Monitor module receives a list of neighbor routers from the PFO-R3 module. It starts sending heartbeat packets to the neighbors and lists for incoming heartbeat packets as well. It sends heartbeat messages to its immediate neighbors every PKT_PERIOD seconds, which is user-configurable.

The overhead on the heartbeat messages is very low. Each heartbeat message is a UDP packet with about 4 bytes of payload, while the OSPF Hello packets consist of at least 44 bytes of payload. The small size of the heartbeat message allows it to be sent at higher frequency, allowing faster link failure detection at a lower overhead.

When a number of the heartbeat messages are missed consecutively, a link failure is declared for the link. The Link Monitor module notifies the PFO R3 module of the link failure via the Unix domain socket. The threshold of number of missed packets before link failure is declared is user-configurable to adapt to different network environments.

The Link Monitor module also monitors the Netlink messages from the kernel for change in status of any router interfaces. When a router interface changes its status from up to down, the Link Monitor module is immediately made aware of the change via the Netlink Messages from the failed interface.

When PFO-R3 receives a link failure notification from the Link Monitor module, it should relay the notification to the neighboring PFO-R3 modules. For efficient use of the network resources, it only notifies PFO-R3 nodes that are affected by the failed link instead of notifying all of its neighboring PFO-R3 nodes. To find out which nodes are affected by the failed link, it looks up all of the non-zero entries in the routing vector that utilizes the failed link. It takes note of the source and destination pairs of all the non-zero entries that utilize the failed link. It then looks up all other links on the current node that are used by those source and destination pairs, and notifies PFO-R3 nodes that are connected to the current node by those links. The PFO-R3 nodes that receive these notification from neighbor PFO-R3 nodes performs the same steps treating the link where the notification came from as a failed link.

In accordance with one aspect, an exemplary embodiment of the present disclosure may provide a method for rerouting traffic in point-to-multipoint (P2MP) network, the method comprising: defining P2MP groups that share a common capacity value; creating a virtual demand for at least two parallel links in the P2MP network; precomputing a routing for an actual demand plus the virtual demand links in the P2MP network on P2MP network topology prior to detecting any failures in at least one of the parallel links in the P2MP network in order to minimize a maximum link utilization over the P2MP network after an occurrence of link failures; detecting that one or more parallel links in the P2MP network that have failed; and converting, by a processor, the precomputed routing into a routing that does not traverse the detected one or more failed parallel links in the P2MP network in response to detecting the one or more failed parallel links in the P2MP network, and wherein the routing that does not traverse the detected one or more failed parallel links. This exemplary embodiment or another exemplary embodiment may further provide representing the virtual demand for the links in the P2MP network as a set of linear constraints accounting for a wireless shared medium between two nodes in the P2MP network. This exemplary embodiment or another exemplary embodiment may further provide implementing programming duality on the set of linear constraints. This exemplary embodiment or another exemplary embodiment may further provide minimizing a maximum link utilization (p) subject to the set of linear constraints, wherein one of the constraints accounts for the wireless shared medium; and broadcasting information across the shared medium from a first node to a plurality of receiving nodes, wherein the receiving nodes receives the information from the first node across the shared medium. This exemplary embodiment or another exemplary embodiment may further provide addressing the constraint for the wireless shared medium during the step of precomputing the routing for the actual demand plus the virtual demand links in the P2MP network. This exemplary embodiment or another exemplary embodiment may further provide summing the data that the first node may send through the wireless shared medium; and decreasing a potential of the shared medium in response to additional nodes joining the P2MP network. This exemplary embodiment or another exemplary embodiment may further provide removing loops in traffic routes in the P2MP network through the constraint that sums the data that the first node may send through the wireless shared medium. This exemplary embodiment or another exemplary embodiment may further provide rerouting traffic on the detected one or more failed parallel links to the routing that does not traverse the detected one or more failed parallel links in the P2MP network. This exemplary embodiment or another exemplary embodiment may further provide accounting for multiple links in the P2MP being constrained to a wireless shared medium. This exemplary embodiment or another exemplary embodiment may further provide tracking and monitoring which link is associated with which node in the P2MP network; and listing which links belong to which nodes in the P2MP network. This exemplary embodiment or another exemplary embodiment may further provide detecting that one or more of the failed like was a wireless link. This exemplary embodiment or another exemplary embodiment may further provide restricting a number of solutions for a network allocation protocol to a number one less than the number of nodes in the P2MP network. This exemplary embodiment or another exemplary embodiment may further provide identifying at least one additional node in the P2MP network that a first node communicates with over a certain frequency; accounting for each piece of data that the first node sends the additional node. This exemplary embodiment or another exemplary embodiment may further provide multicasting information across wireless parallel links in the P2MP network. This exemplary embodiment or another exemplary embodiment may further provide wherein the precomputing, the detecting one or more links in the P2MP network that have failed and the converting are performed in connection with handling traffic variations and topology variations; wherein the precomputing performed in connection with the handling of traffic variations and topology variations comprises precomputing the routing for a convex combination of multiple actual demands plus the virtual demand for the parallel links in the P2MP network; wherein the precomputing, the detecting one or more links in the P2MP network that have failed and the converting are performed in connection with handling realistic failure scenarios and wherein the handling of realistic failure scenarios comprises adding constraints that encode knowledge that a single composite failure or a maintenance event simultaneously disables multiple links; wherein the precomputing, the detecting one or more links in the P2MP network that have failed and the converting are performed in connection with handling prioritized traffic with different protection levels, wherein the precomputing performed in connection with the handling of prioritized traffic with different protection levels comprises precomputing the routing such that, as long as a number of parallel link failures is less than or equal to a specified protection level associated with a traffic priority, all traffic with equal or higher priorities can be routed by the routing without having congestion; and wherein the precomputing, the detecting one or more links in the P2MP network that have failed and the converting are performed in connection with achieving tradeoff between performance under normal and failure conditions. This exemplary embodiment or another exemplary embodiment may further provide wherein the achieving tradeoff between performance under normal and failure conditions comprises bounding a ratio between a performance under a derived protection routing and a performance under an optimal routing under failures.

In another aspect, an exemplary embodiment of the present disclosure may provide at least one non-transitory computer readable storage medium storing a computer program product that, when executed by a processor, implements operations to reroute traffic in an point-to-multipoint (P2MP) network, the computer program product comprising the programming instructions of: define P2MP groups that share a common capacity value, wherein the common capacity value refers to link capacities that are defined into groups; create a virtual demand for at least two parallel links in the P2MP network; precompute a routing for an actual demand plus the virtual demand links in the P2MP network on P2MP network topology prior to detecting any failures in at least one of the parallel links in the P2MP network in order to minimize a maximum link utilization over the P2MP network after an occurrence of link failures; detect that one or more parallel links in the P2MP network that have failed; and convert, by the processor, the precomputed routing into a routing that does not traverse the detected one or more failed parallel links in the P2MP network in response to detecting the one or more failed parallel links in the P2MP network, and wherein the routing that does not traverse the detected one or more failed parallel links. This exemplary embodiment or another exemplary embodiment may further provide the programming instructions of: represent the virtual demand for the links in the P2MP network as a set of linear constraints accounting for a wireless shared medium between two nodes in the P2MP network. This exemplary embodiment or another exemplary embodiment may further provide the programming instructions of: minimize a maximum link utilization ($\mu$) subject to the set of linear constraints, wherein one of the constraints accounts for the wireless shared medium; broadcast information across the shared medium from a first node to a plurality of receiving nodes, wherein the receiving nodes receives the information from the first node across the shared medium; address the constraint for the wireless shared medium during the step of precomputing the routing for the actual demand plus the virtual demand links in the P2MP network; sum the data that the first node may send through the wireless shared medium; decrease a potential of the shared medium in response to additional nodes joining the P2MP network; and removing loops in traffic routes in the P2MP network through the constraint that sums the data that the first node may send through the wireless shared medium.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
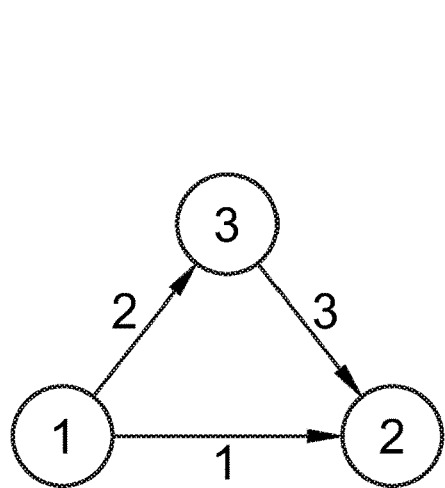
FIG. 1 (FIG. 1) is a diagram of a generic network indicating three nodes connected by links or edges.

Embodiments of the present disclosure now will be described more fully hereinafter with reference to the accompanying drawings, in which some, but not all embodiments of the claims of the present disclosure are shown. Indeed, embodiments of the present disclosure may be embodied in many different forms and should not be construed as limited to the embodiments set forth herein; rather, these embodiments are provided so that this disclosure will satisfy applicable legal requirements.

The present disclosure broadly discloses a method and system for a Wireless Resilient Routing Reconfiguration linear program or protocol (WR3LP), a routing protection scheme that is (i) congestion-free or reduced congestion under a wide range of failure scenarios in point-to-multipoint networks, (ii) efficient in terms of router processing overhead and memory requirement in wireless and point-to-multipoint networks, (iii) flexible in accommodating diverse performance requirements in wireless and point-to-multipoint networks (e.g., different traffic protection levels), and (iv) robust to traffic variations and topology failures in wireless and point-to-multipoint networks. Here by "congestion-free", it means that all traffic demands (except those demands that have lost reachability due to network partition) are routed without creating any link overload. This is a much stronger guarantee than providing reachability alone.

In accordance with one aspect of the approach of embodiments described herein is a general method for covering all possible failure scenarios with a compact set of linear constraints on the amounts of point-to-multipoint network traffic that should be rerouted. Specifically, when links fail, the traffic originally routed through each failed link has to be rerouted by the remaining wireless network. While the amount of rerouted traffic for a failed link depends on the specific failure scenario, it is typically upper bounded by the capacity of the failed link (so long as the routing before the failure is congestion-free). Therefore, by creating a virtual demand for every link in the wireless and point-to-multipoint network (whose volume is equal to its link capacity) and taking the combination of all such virtual demands, one non-limiting exemplary method of embodiments can cover the entire or a majority of space of rerouted traffic under all possible combinations of link failures. Since the virtual demands can be represented as a compact set of linear constraints, linear programming duality can be leveraged to efficiently optimize routing over the entire set for the wireless and point-to-multipoint networks. In this way, the method of embodiments eliminates the need for enumerating failure scenarios by converting topology uncertainty (due to failures) into uncertainty in rerouted traffic, which may be easier to cope with.

Since the virtual demands are upper bounds of the rerouted traffic, the exemplary method of embodiments described herein provides that if a routing is congestion-free over the virtual demand set, it yields a link protection scheme that is congestion-free under all possible failure scenarios in wireless and point-to-multipoint networks. The converse is also true for single-link failures: if there is a link protection scheme that can guarantee no congestion for all single-link failure scenarios, then there must be a routing that is congestion-free over the entire virtual demand set in wireless and point-to-multipoint networks. Therefore, the seemingly wasteful replacement of rerouted traffic with link capacities is actually efficient.

Based on the foregoing general method of embodiments for converting topology uncertainty to traffic uncertain, embodiments of the present disclosure further provide a routing protection scheme called Wireless Resilient Routing Reconfiguration Linear Program (WR3LP), which comprises an offline precomputation phase and an online reconfiguration phase in wireless and point-to-multipoint networks. During the offline phase, according to one embodiment, WR3LP computes routing for the actual demand plus the virtual demand on the original wireless and point-to-multipoint networks topology. During the online reconfiguration phase, according to one embodiment, WR3LP responds to failures using a rescaling procedure, which converts the offline precomputed routing into a protection routing that does not traverse any failed links in wireless and point-to-multipoint networks. Some exemplary features of WR3LP as described herein is that it is (i) provably congestion free under multiple link failures in wireless and point-to-multipoint networks, and (ii) provably optimal for single-link failure scenarios in wireless and point-to-multipoint networks.

Embodiments of the present disclosure further provide methods for extending WR3LP to handle (i) traffic variations in wireless and point-to-multipoint networks, (ii) realistic failure scenarios in wireless and point-to-multipoint networks, (iii) prioritized traffic with different protection levels in wireless and point-to-multipoint networks, and (iv) the tradeoff between performance and resilience in wireless and point-to-multipoint networks.

If the networking link goes down, the link must be restored in order to reestablish a connection between the two nodes through which the link was broken. Planning for and designing for corrupted or disconnected links can be difficult for a network routing scenarios. Thus, when a link goes down, the network is stuck with the routing configuration that exists after the link is disconnected. Typically, the link is restored; however, this can take a significant amount of time such as hours or days.

The present disclosure provides a wireless management system and policy that is based on the R3 configuration, but further includes wireless routing technology. For wireless communications, communications are not necessarily point to point. Wireless communications may be from one point to many points at once. For example, wireless broadcasting occurs from one point to many points. Alternatively, there is wireless multicasting from one point to multi-points.

The R3 framework does not account for wireless communications. In order to improve on the R3 framework, the present disclosure requires additional constraints to the R3 framework. Additional constraints for the present disclosure work in conjunction with tracking and monitoring what communications channel belongs to which node in the network. In one particular embodiment, there is a list of which links belong which node and the process of maintaining the list is intricate once wireless communications are added to an existing R3 framework. Once there are parallel communication opportunities, the existing R3 framework struggles. Thus, the present disclosure provides additional constraints that address for the parallel communications capabilities. The present disclosure provides a network that is able to maintain a structure that maps wireless links to nodes and solves for the additional constraints that wireless connections impose.

The constraints may be added to an existing R3 framework to effectuate the wireless routing reconfiguration of the present disclosure. The constraints implemented by the present disclosure are identified in Equation 17 and Equation 18.

Equation 24 (introduced below) details combining Equation 23 (introduced below; pertaining to wireless constraints) with Equation 11 (discussed below; pertaining to conventional R3 constraints) to enable the wireless R3 linear program (WR3LP). Equation 11 is configured to minimize a maximum link utilization ($\mu$) subject to a number of constraints. In one particular embodiment, there are at least six different constraints. Each of the constraints is considered a family of constraints with sub-constraints contained therein on the order of up to hundreds of thousands. Equation 23 is another family of wireless constraints that can be combined with Equation 11 to effectuate wireless communications to be accounted for in the WR3LP. Equation 23 is further encoded with the list maintenance to identify which links are maintained between which nodes. Equation 24 further restricts the space of solutions for a network allocation problem.

In accordance with one aspect of the present disclosure, one exemplary R3 framework for wired networks (i.e., point-to-point and not point-to-multipoint) is identified in U.S. Pat. No. 8,477,597 (the '597 patent), the entirety of which is incorporated herein by reference. The '597 patent provides no explanation that wireless links may be utilized in its R3 protocol. With respect to the '597 patent, the only way that wireless connection would be possible would be if the mathematic equations for the wireless and the wired links were equivalent. However, they are not inasmuch as the description of the '597 patent does not describe the wireless characteristics (i.e., point to multi-point).

The WR3LP framework of the present disclosure plans ahead and selectively enables the framework to determine how to route information through the network in the event the wireless parallel link fails. Stated otherwise, the WR3LP protocol precomputes a routing for an actual demand plus the virtual demand links in the P2MP network on P2MP network topology prior to detecting any failures in at least one of the parallel links in the P2MP network in order to minimize a maximum link utilization ($\mu$) over the P2MP network after an occurrence of link failures. The technique may use a selected number of contingency plans. In one particular embodiment, there may be up to four contingency plans to determine how deep the plan needs to address for contingent failures. In one example the plan addresses a number of contingency routes equal to one less than the number of wireless nodes. Additionally, if a node is completely cut off, there may not be a contingent plan for that node. If there is no additional link to communicate with a node, then that node may not have a contingent plan.

The constraints encode the contingent plans via virtual demands of the information to be transmitted from all the various nodes in the network. The virtual demands determine how to satisfy the demand in the event a given link is disrupted. The planning process identifies this prior to initiating the network. Equation 23 (discussed below) addresses these additional constraints for the planning to address the multi-point communications.

In accordance with one aspect of the present disclosure, the network does not exhaust and innumerate the failure scenarios because the number would simply be too great for the system to accommodate. The constraints used in the present disclosure enable the system to solve for a set of parameters or for one instance in which any four any other number of links begin to fail. The system does not address which number of links fail, but rather just the number of links that fail. The system can address the correct response for solving when a number of links are offline.

As indicated above, in a wired network, every point-to-point connection has its own link utilization and bandwidth. For example when a first Node A (which may also be referred to as "Alice") is communicating with a second Node B (which may also be referred to as "Bob"), that communication has no bearing on the communication that Alice (Node A) is having with a third Node C (which may also be referred to as "Charlie"). Node B and Node C may be part of a plurality or receiving nodes. Started otherwise, the communication links are independent and have their own physical capacities that are the product of the communications prodigal extending over the wire. For wireless communications, Alice (Node A) communicates with Bob and Charlie (Nodes B and C respectively and other receiving nodes from a plurality of receiving nodes) over the same frequency. While there are available protocols in which the Nodes B and C can determine when to receive the information from Node A (such as time division multiple access (TDMA) protocol and code division multiple access (CDMA) protocol). Despite these protocols, the signals sent from Node A are still in the same electromagnetic spectrum and are broadcasting to both Node B and Node C and the other receiving nodes. Thus, there are a limited number of bits of information that Node A may transmit at any given frequency per unit time due Nodes B and C and any other receiving nodes.

In point-to-multipoint connections or communications, anything that Alice transmits precludes Alice from sending other information to exclusively Bob or Charlie (at the same time). Thus, if Alice desires to send information exclusively to Bob, Alice must waste Charlies "receive" bandwidth during that same time. Alice's ability to communicate with Charlie is degraded by virtue of that fact that there is only a certain amount of time in which signals may be sent. Thus, for the time that Alice spends communicating to Bob there is a proportional amount of time less to communicate with Charlie. There is less time available for Alice to send bits of information to Charlie that are specific to Charlie. In wireless channels, there is competition between the nodes for the same wireless communication medium. As such, this competition and constraint is not readily present in wired communications and protocols, such as conventional R3, as there is independent mediums connecting nodes in a point-to-point relationship.

The wireless constraints, identified below as equation 22 and as equation 23, identify that there are only a certain number of bits per second that Alice may transmit over a given frequency at a given time to transmit these bits to every node that is on this frequency. If Alice wants to send a message to Bob, then Alice must use Charlie's "receive" bandwidth, and if Alice wants to send a message to Charlie, then Alice must use Bob's "receive" bandwidth. Again, this is not necessary in a wired network because individual messages can be sent directly across individual links or mediums in a point-to-point manner. Thus, in the wireless network the constraint is the shared medium.

Shared mediums in conventional R3 linear programs were heretofore unaccounted in R3 protocol. Equation 22 and 23, introduced below, account for the additional constraint of the shared medium to effectuate a resilient routing reconfiguration linear program that accounts for a shared medium between nodes in a wireless network or a point-multipoint network. Thus, the constraint of the shared medium identified between nodes in a wireless network in the president disclosure is in addition to a conventional R3 linear program. Thus, the present disclosure provides an advantage over conventional R3 protocol that enable network reconfiguration to be accomplished when there are point-to-multipoint connections in a wireless network. Stated otherwise, the shared medium introduces the constraint that is embodied in equations 22 and 23. In one particular embodiment, equation 17 and equation 23 identifies some, most, or every node in the point-to-multi-point network that Alice can communicate with over a given frequency or connection and accounts for each piece of data that Alice needs to send to the recipient nodes (i.e., Bob or Charlie or others).

Equations 22 and 23 sum the amount of information that Alice is able to transmit through its/her transmitter and across the shared medium. It is necessary because the shared medium is related and establishes the communication links between the nodes and the wireless network. In the wireless setting, Alice communicates to Bob and Charlie at the same time is what is captured in equation 22 and 23 to enable the wireless communications shared medium constraint to be accounted for. When another node comes on-line, such as a fourth Node D (which may also be referred to as "David") the topology for the linear program must be re-run to determine new routes that can be utilized in the event of link failure. Additional nodes that come on-line have an effect on the wireless constraint equation 22 and 23 by adding another term in the sum in equation 22 and 23 (or multiple terms if there are multiple nodes that come on-line). One side of equation 22 and 23 is constant identifies how many bits Alice can transmit through its transmitter and the other side of equation 22 and 23 adds the additional term for Node D which decreases the potential of the remaining nodes in the network. Stated otherwise, by adding an additional node (i.e. David), this addition reduces the amount of individual communications that Alice can address to the wireless network participants, such as Bob, or Charlie, or David. Alice may multicast such as sending something to all three of the Nodes B, C, and D but if Alice wants to direct specific communications to either Node B or Node C or Node D then there is proportionally less that Alice can send to those nodes.

If the link between Alice and Charlie fails, the remaining nodes in the network are Bob and David (Node B and Node D). Thus, in order for Alice to communicate with Charlie, Alice must send a communication message either through Bob or either through David, which are still in communication with Charlie (Node C). The network topology would not need to be re-run to identify the failure of the link between Node A and Node C. Similar to R3 protocols, the present disclosure utilizes routing plans to identify the routing requirements needed to identify and transmit information to a node in the wireless network when one of the communication links goes down. Further, similar to R3, when a communication link with a node fails and goes down, the plan implements a routing protocol to transmit information from the sender to the recipient through another node and network. When a new node joins the wireless network, then the network topology and routing scheme must be re-run. So if the link between Alice and Charlie goes down, the network knows how to adaptively route information from Alice from other nodes from the network to get to Charlie. However, this may cause the link utilization to increase because information that is now needing to get to Charlie through either Bob or David must be joined with the other information that is already being sent to Bob or David. Thus, the link utilization can increase exponentially very quickly.

Figure 4:
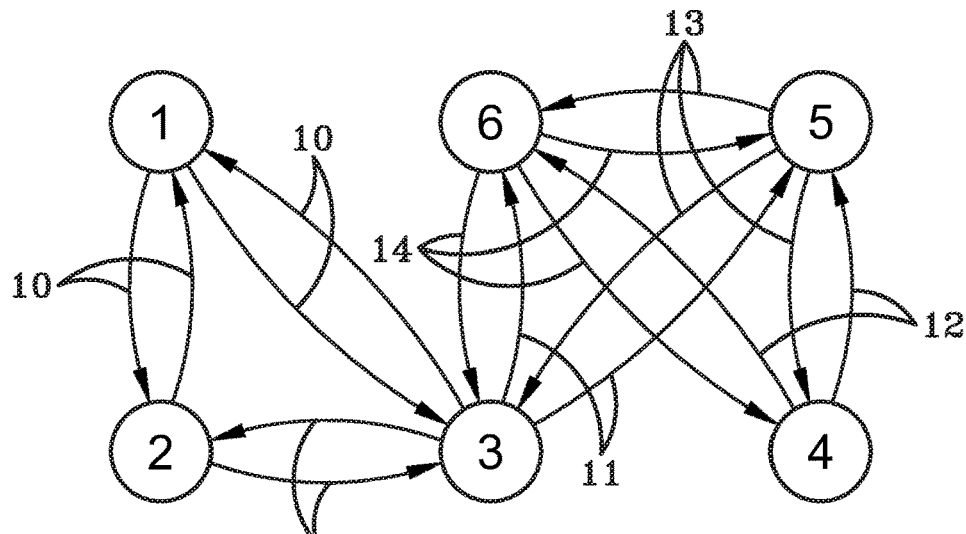
FIG. 4 (FIG. 4) is a diagram of groups in a network in depicted communication between three fixed nodes 1-3 and three moveable nodes 4-6.

As will be described in greater detail below, FIG. 4 depicts another example of a plurality of nodes in a point-to-multipoint network. Particularly there may be six nodes. Specifically, there may be a first node 1, a second node 2, a third node 3, a fourth node 4, a fifth node 5, and a sixth node 6. Three of the six nodes (i.e., nodes 1-3) may be bay stations that are fixed on the earth, or other non-moveable devices. Particularly, these would be wired connections 10. The nodes 4, 5, and 6 may be nodes that are wirelessly connected that are communicating at the same time over wireless links in a shared medium. The shared medium or media between the wireless nodes is a transmission medium that is a non-solid material substance (liquid, gas, or plasma) that can propagate energy waves. Thus, node 3 communicates with nodes 5 and 6. Node 6 communicates with nodes 5, 4, and 3. The point to multi-point transmissions that occur through the communication between nodes 4, 5, and 6 are different than the wired communications between nodes 1, 2, and 3. For example, for node 2, communication may occur with node 1 and node 3. These communication links are different than the wireless links of nodes 4, 5, and 6. The communications are broadcast communications to nodes 4, 5, and 6.

Nodes 4, 5, and 6 receive the same information from the source that is broadcasting the same. As such, the links (or edges) connecting the wireless nodes may be consider parallel links since information broadcasted over the parallel link is the same and is received by the receiving nodes. Typically R3 framework would not be optimally operable when calculating a failed link in a wireless broadcast configuration. The wireless links from mobile node 3 to node 5 and node 6 are shown at 11. The wireless links from mobile node 4 to node 5 and node 6 are shown at 12. The wireless links from mobile node 5 to node 3, node 4, and node 6 are shown at 13. The wireless links from mobile node 6 to node 3, node 4, and node 5 are shown at 14.

Results from small examples allowed validate implementations of the linear program setup, the results of its solution, and the reconfiguration step, including a symbolic form of the setup phase. Additionally, they facilitated validated implementations of alternative routing constraints based on symmetry and reachability considerations, topology virtualization and concomitant load evaluation in the presence of parallel links, and finally of the point-to-multipoint constraint (Equations 22 and 23 discussed below).

These results from the examples also provided two particularly important insights. First, the present disclosure determined that reconfiguration can lead to loops in traffic routes. However, as previously mentioned, the loops eventually self-resolve. Furthermore, there may be techniques for preemptively removing loops such as the addition of constraints in the linear program. Indeed, the reconfiguration always preserves flow conservation, but not necessarily some of the other routing constraints. While the inventors investigated various post-processing approaches including flow decomposition to eliminate these spurious loops, none was found to perform as would be desired. A second important insight yielded from these small examples is that reconfiguring is efficient, but not optimal. Consider some topology in FIG. 2 in which all links have unit capacity except for the links between vertices 2 and 4, which have parametrically varying capacity a.

Figure 6:
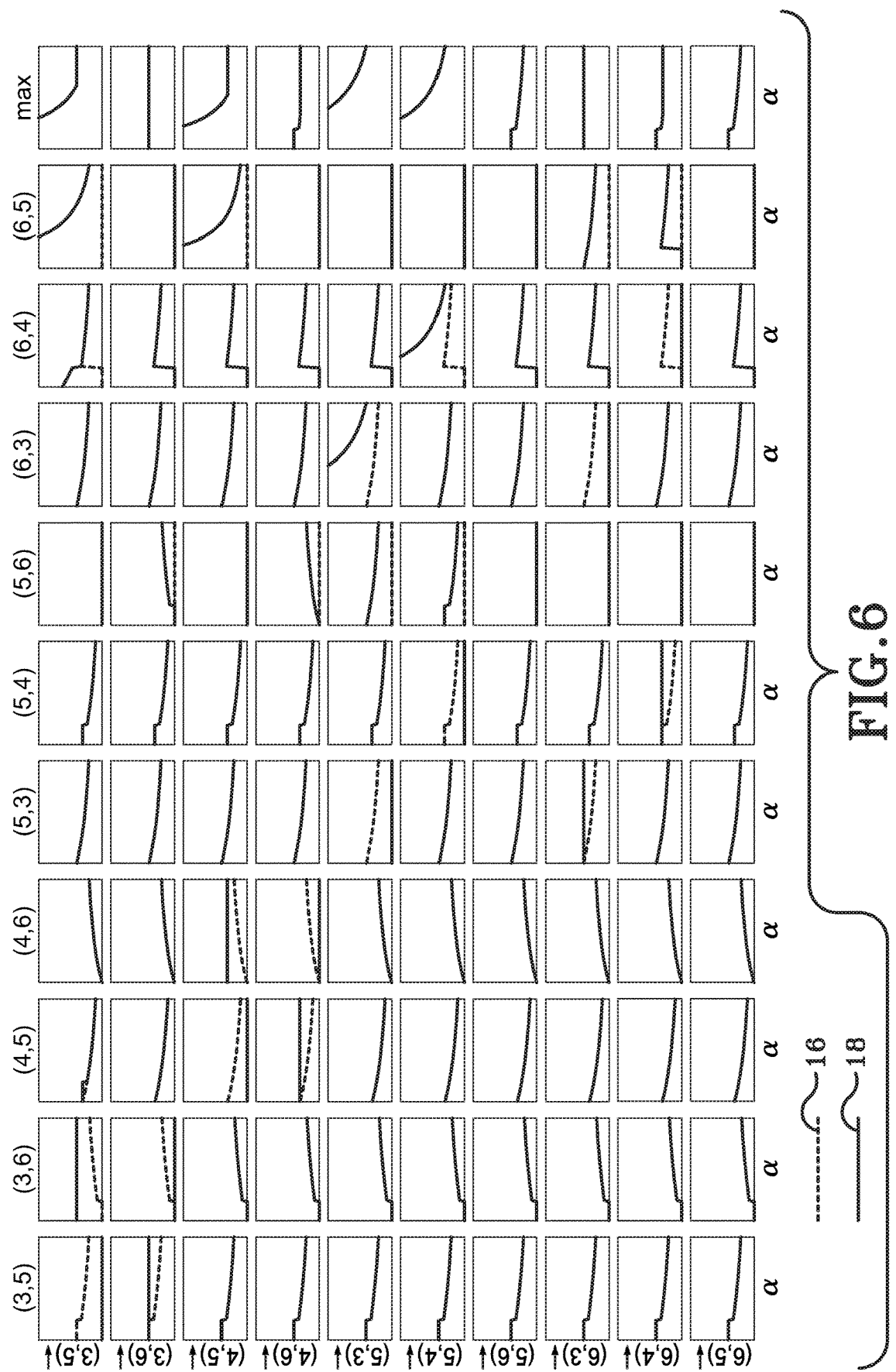
FIG. 6 (FIG. 6) is a series of plots indicating different link that fail and the behavior of the link is indicated by different lines.

As indicated in the FIG. 6, the X-axis represents the parameter of varying capacity a for the capacity of one wireless link. The amount of information that may be wirelessly sent along the point to multi-point link may be varied. The rows represent links that fail. Thus, every row is a different link that fails. The columns represent links that have not failed get used in response to the links that do fail. The line 16 represents the link before it fails and the line 18 represents the link after it fails. The boxes on the diagonal from the upper left to the lower right represent that there is some amount of information going over the link that fails and then when the link fails, the information goes to zero. When the link fails, no information is able to proceed through the broken link. Thus, line 16 representing along the diagonal that no information can transmit after the communication link fails. The graph represents a single failure and the orders and actions that can be schematically represented when the link fails and how the link will operate and behave.

Reference elements represent the paths along with information travels from the first subscript to the second subscript. For example, as indicated in $r_{14}$, the arrow indicates the pattern that the traffic along the link would flow from the first node to the second node. Reference elements of the links represented by these symbols correspond to the Reference elements of the communication links represented in FIG. 7 and FIG. 9 and the reference elements correspond to which links are being traversed in the event they fail. The traffic represented by dashed arrows indicate that some information can travel along the dash paths, while other similar information travels to other nodes. Thus the information can take two different paths. At the layer of the network detailing the routing, the traditional R3 network cannot handle the point to multi-point networking. Accordingly, the present disclosure solves this need by providing the constraints for wireless or other point to multi-point networking capabilities in addition to a conventional R3 framework. The term "parallel edges" refers to the communication links that happen simultaneously. For example, a first node can simultaneously communicate with a second node and a third node. The division does not need to be 50%-50%. The present disclosure provides that the alternative routing for the network may be accomplished fairly quickly because the selective preplanning that goes into effect to determine how to reroute the network when a link fails. Thus, while the bandwidth may be relatively low and the amount of information may be considerably slower than traditional commercial aspects, the selective preplanning of failure enables the network to operate effectively instantaneously as observed by the node since the network knows in advance how to perform in the event of a link failure.

Figure 10:
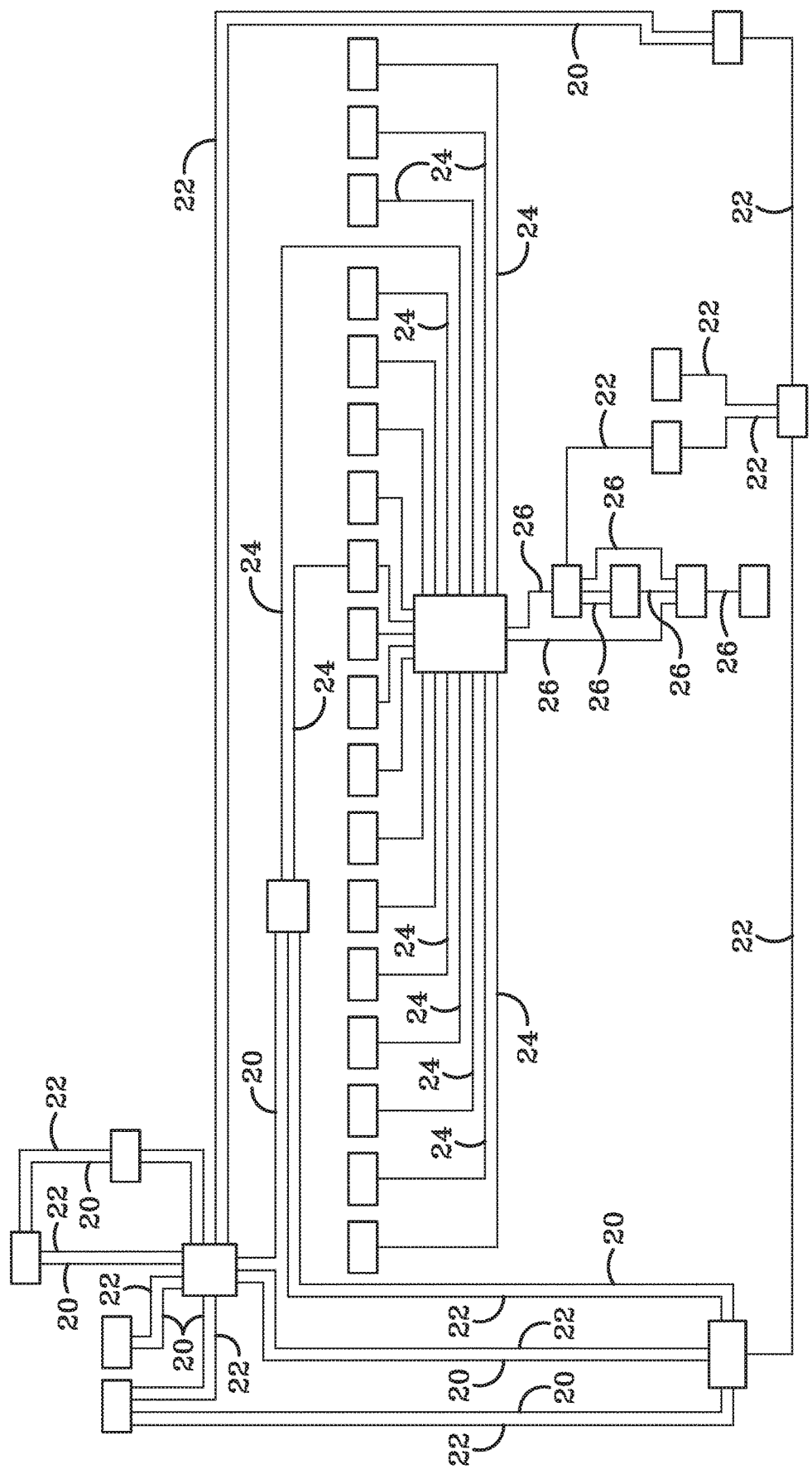
FIG. 10 (FIG. 10) is an exemplary schematic view of a point-to-multipoint network with bidirectional links with different capacities.

The network topology and capacity is indicated in FIG. 10. Link capacities are defined into groups as follows: links 20 have capacity $10^{-4}$ Gbps, links 22 have capacity $10^{-3}$ Gbps, links 24 have capacity $10^{-1}$ Gbps, and links 26 have capacity $10^{-1}$ Gbps. Point-to-multipoint connections are defined by similar reference elements (i.e., links 20, links 22, links 24, or links 26): i.e., each set of edges from a given vertex with a given similar link (i.e., links 20, links 22, links 24, or links 26) defines a "point-to-multipoint group" between the nodes, wherein each box in FIG. 10 represents a node in the network.

FIG. 10 further depicts a capacitated topology of an embodiment of the present disclosure applying a model in which the traffic demand from a to b is proportional to the total outbound capacity at a times the probability of b as computed by PageRank. The present disclosure considered two different constants of proportionality corresponding to low-demand and high-demand cases. The high demand case may be chosen carefully so that the maximum link utilization was just below 1 without any link failures. At the same time, an embodiment of the present disclosure considered a varying number F of possible failures (with congestion possible for F>0). Note that the single link from MV22_1 (i.e., a first node) to MV22_8 (i.e., a second node or a receiving node) is particularly vulnerable to congestion as overall demand increases.

The present disclosure extends R3 resilient routing reconfiguration framework to accommodate point-to-multipoint communication makes it suitable for tactical use. It gives a principled quantitative framework not only for instantly adapting to network failures, but also for planning for them. Particularly vulnerable links can be identified, and capacity added as required. This will allow less overprovisioning that would unnecessarily place critical assets in jeopardy. Moreover, an embodiment of the present disclosure has shown that failover performance is near that of an optimal solution given foreknowledge of a network link failure.

A small test case using NRL's CORE simulation environment indicates the potential for tactical use. It shows that PFO-R3 can be integrated with existing routing protocols such as OSPF and can instantly provide protection routes when a link failure happens, which results in lower link utilization than when only OSPF is used. By reconfiguring on the fly while continually solving for the current network state, an ideal compromise between resiliency, low latency, and optimality can be reached.

To help the reader of this disclosure better understand some exemplary aspects of the present disclosure, the remainder of this detailed description will be organized as follows. Section 1 further discusses problems associated with existing R3 programs and protocols. Section 2 provides an overview of preexisting R3 programs. Section 3 formulates formal notations and definitions for basic quantities of interest to R3. Section 4 identifies how routing constraints may be effectively formulated using tensor product structure. Section 5 provides the linear program embodying the offline precomputation for R3 in matrix form. Section 6 details the online reconfiguration step. Section 7 identifies point-to-multipoint communications of the sort prevalent in wireless networks. Section 8 introduces the corresponding generalization of the WR3LP.

1. GENERAL INTRODUCTION

It is desirable for networks to be resilient in the face of link failures. However, naive methods for generating routing protection schemes that account for congestion have complexity that grows combinatorially with the number of failures to protect against. That is, if a network has N links and protection is required for up to F link failures, then there are $$\sum_{k=0}^{F} \binom{N}{k}$$

possible failure scenarios for which to plan. For N=100 and F=2, this number is 5051; for F=4, it is 4087976. This combinatorial overhead precludes brute-force approaches to resilient traffic engineering. Furthermore, planning for the combination of a large number of scenarios should be coordinated in such a way to minimize disruptions to the traffic pattern when new failures occur. Both of these issues make it clear that optimizing traffic routing with respect to individual failure scenarios is an inadequate basis for a traffic engineering strategy.

This challenge was addressed using R3, a congestion-avoiding routing reconfiguration framework that is resilient under multiple failures. Generally, R3 accounts for all possible failure scenarios within a single optimization problem by adding "virtual" traffic corresponding to the capacity of links that might fail. This converts uncertainty in network topology into uncertainty in traffic. A base routing r that optimizes maximum link utilization is solved for along with a protection routing p that encodes detours in the presence of link failures. As links fail, r and p are updated using a handful of simple arithmetic operations and traffic is rerouted accordingly. Because the update operations are so simple, network losses and latency are minimized. Meanwhile, in the background a solver can continuously monitor the current network connectivity and solve for optimal base and protection routings to replace the near-optimal updates as network stability permits.

R3 enjoys several theoretical guarantees regarding congestion avoidance, optimality, and the order of link failures. Perhaps more importantly, it is also efficient in practice, where the theoretical requirements for these guarantees do not typically hold. For example, a single node on the network edge may be isolated with fewer than F failures, but the traffic pattern that R3 generates will not be adversely affected by this degeneracy.

Proactive alternatives to R3 have been proposed however, their reliance on predicted traffic demand adds an element of uncertainty that R3 avoids. Furthermore, these alternatives do not offer the theoretical guarantees of R3.

2. INFORMAL OVERVIEW OF R3

The network can be modeled as follows. Let G=(V, E) be a directed multigraph modeling the network topology in which the vertices V are network routers and the edges E are directed links between the routers. It will be convenient to write $s(\ell)$ and $t(\ell)$ respectively for the source and target (or tail) of a link $\ell$. The link capacity is modeled as a nonnegative function c on E and the traffic demand is modeled as a nonnegative function on V 2. If a, b∈V and $\ell \in$E, then the value $r_{ab}(\ell)$ of a base routing r specifies the fraction of traffic with origin a and destination b that traverses the link $\ell$. Thus the total amount of traffic on link $\ell$ is $\Sigma$a, b∈Vdabrab($\ell$), where $d_{ab}$ is the demand from a to b. More generally, a routing (defined formally in Equation 5 below) is any function from $V^2 X E$ to [0, 1] that satisfies natural constraints corresponding to conservation, totality, and global acyclicity of flow.

In the R3 framework, the capacitated topology (V, E, c) and demand d are given along with a number F of allowed link failures. A base routing r and protection routing p are derived to ensure congestion-free traffic flow under ≤F link failures if sufficient connectivity exists to begin with, and more generally to give resilient routing in the presence of multiple link failures.

The protection routing p has the particular requirement that its nontrivial origin/destination pairs are of the form $(s(\ell), t(\ell))$, and it encodes weighted alternative paths from $s(\ell)$ to $t(\ell)$. Thus when link $\ell$ fails, the remaining paths from $s(\ell)$ to $t(\ell)$ can be reweighted and used in place of $\ell$. This reconfiguration (which applies to both r and p) only requires very simple arithmetic operations and can therefore be applied essentially instantaneously. Meanwhile, a background process can continuously solve for base and protection routings for the current topology and number of remaining allowed link failures to smoothly transition from optimal pre-planned routes to routes that are optimal for the actual current failures and residual possible failures.

To plan for arbitrary link failures, the virtual demand set $Z_F := \{z: (0 \leq z \leq c)^\wedge (\Sigma \ell' \; z\ell'/c\ell' \leq F)\}$ is considered and created. Each point $z \in Z_F$ corresponds to a potential load on the network that saturates no more than F links on its own. Now in principle r and p could be obtained by first requiring each to be a routing and then solving the constrained optimization problem $$\min_{r,p} \mu \text{ subject to } \underbrace{\sum_{a,b \in V} d_{ab} r_{ab}(\ell)}_{\text{actual traffic on link } \ell} + \underbrace{\sum_{\ell' \in E} z_{\ell'} p_{s(\ell'),t(\ell')}(\ell)}_{\text{virtual traffic on link } \ell} \overset{\forall z \in Z_F, \ell \in E}{\leq} c_\ell \mu \quad \text{(Equation 1)}$$

That is, the optimization requires that the sum of actual and virtual traffic not exceed the link capacity times the maximum link utilization $\mu$. So long as the objective $\mu \leq 1$, congestion-free routing is possible under F link failures.

In practice, the optimization problem above is not in a useful form. However, it can be transformed into an equivalent linear program using the duality theorem. This transformation is elaborated in further detail below. The solution time varies only indirectly with F, though for larger values more redundancy is demanded of a solution and routing performance will necessarily be affected. Thus the value of F chosen should reflect some specific planning consideration.

Once r and p are obtained via the solution of the WR3LP (detailed below), traffic can be routed using r and reconfigured using both r and p. Schematically, if link $\ell$ fails, then reconfigure (r, p) 1→(r',p') according to $$r_{ab}'(\ell') := r_{ab}(\ell') + r_{ab}(\ell) \cdot \xi_\ell(\ell') \quad \text{(Equation 2)}$$

and $$p_{s(\ell'),t(\ell')}'(\ell'') := p_{s(\ell'),t(\ell')}(\ell'') + p_{s(\ell'),t(\ell')}(\ell') \cdot \xi_\ell(\ell'') \quad \text{(Equation 3)}$$

where $$\xi_\ell(\ell') := \begin{cases} 1 & \text{if } p_\ell(\ell') = 1 \\ \dfrac{p_\ell(\ell')}{1 - p_\ell(\ell)} & \text{otherwise.} \end{cases} \quad \text{(Equation 4)}$$

This update rule is also applied for subsequent failures and results in essentially instantaneous rerouting.

There are two theoretical subtleties in the offline configuration phase of R3 in which the base routing r and protection routing p are computed. The first of these subtleties is related to parallel links. The second is the intricate indexing required in setting up the key linear program. These are respectively tackled by a topology virtualization step that uses virtual nodes to eliminate parallel links (necessary for the self-consistency of the framework), and the judicious use of tensor algebra.

R3 was developed for wired network backbones: however, the present disclosure has extended the approach in such a way that it can apply to tactical networks with both wired and wireless connections. One exemplary manner to do this is to impose an additional constraint that ties the capacity of a wireless transmitter to its point-to-multipoint connection that generally incorporates multiple edges.

3. PRELIMINARIES

Let $G=(V, E)$ be a finite directed multigraph. That is, V is a set of vertices, E is a set of edges, and there are associated functions s: $E \to V$ and t: $E \to V$ respectively determining the sources (s) and targets (t) of edges. Without loss of generality, let $V=[n] \equiv \{1, \ldots, n\}$ and $E=[N]$, so that $|V|=n$ and $|E|=N$.

Let d: $V^2 \to \mathbb{R}_{\geq 0}$ with zero diagonal (i.e., $d(a, a) \equiv 0$) be the traffic matrix and write $d_{ab} := d(a, b)$. Let c: $E \to \mathbb{R}_{\geq 0}$ be the link capacity. A function r: $V^2 \times E \to \mathbb{R}$, written $r((a, b), \ell) =: r_{ab}(\ell)$, is called a (flow representation of a) routing if the following conditions are satisfied for all $(a, b, \ell) \in V^2 \times E$:

$$r_{aa}(\ell) = 0; \quad \text{(Equation 5)}$$

$$\sum_{\ell: s(\ell)=j} r_{ab}(\ell) = \sum_{\ell': t(\ell')=j} r_{ab}(\ell'), a, b,$$

j distinct, j not a source or target of G;

$$\sum_{\ell: s(\ell)=a} r_{ab}(\ell) = 1, a \neq b; a \text{ not a target of } G;$$

$$\sum_{\ell: t(\ell)=b} r_{ab}(\ell) = 1, a \neq b; b \text{ not a source of } G;$$

$$r_{ab}(\ell) = 0, a \neq b, t(\ell) = a;$$

$$r_{ab}(\ell) = 0, a \neq b, s(\ell) = b;$$

$$r_{ab}(\ell) \in [0, 1].$$

FIG. 1 depicts a counting r where reference elements 1, 2, and 3 indicate edge indices that behave poorly. Namely, $r_{ab}(\ell)=1$ for $(a,b, \ell) \in \{(2,3,2),(3,1,3)\}$, despite the fact that in both cases there is no path from a to b, much less one traversing $\ell$ with $t(\ell) \neq a$ and $s(\ell) \neq b$.

Some previous disclosures ignore the requirement that j should not be a source or target of G [i.e., that j should have positive in- and out-degrees], and notationally suggests that there are no parallel edges: however, all of these modifications are self-evidently desirable, not least in that they avoid degeneracies and manifestly enforce symmetry.

It may be useful to deal with a weaker notion than a routing. For instance, a routing may take spurious nonzero values. Although in most respects such spurious values are harmless, they also involve equations to pointlessly solve and they complicate the understanding. As such the present disclosure introduces the weaker notion of a semirouting, in which Equation 5 is satisfied only for $(a, b, \ell) V^2 E$ such there are paths in G from a to $s(\ell)$ and from $t(\ell)$ to b, and such that $t(\ell) \neq a$ and $s(\ell) \neq b$. A semirouting that identically takes the value zero on triples not of this form will be called a restricted semirouting.

Much of the effort in setting up the key offline precomputation represented as a linear program (referred to henceforth as "R3LP" and appearing in a later section) in matrix form is tied to intricate indexing that some basic tensor algebra can clarify. Let $e_j^{(n)}$ denote the jth standard basis vector in Rn: then $e_j^{(n)} \otimes e_{j'}^{(n')} = e_{(j-1)n'+j'}^{(nn')}$, where as usual $\otimes$ denotes the tensor product. Introduce generic vectors $$r := \sum_{\substack{a,b \in [n] \\ a \neq b \\ \ell \in [N]}} r_{ab}(\ell) \cdot e_a^{(n)} \otimes e_b^{(n)} \otimes e_\ell^{(N)};$$

$$p := \sum_{\ell, \ell' \in [N]} p_{s(\ell)t(\ell)}(\ell') \cdot e_\ell^{(N)} \otimes e_{\ell'}^{(N)};$$

$$\pi := \sum_{\ell, \ell' \in [N]} \pi_\ell(\ell') \cdot e_\ell^{(N)} \otimes e_{\ell'}^{(N)};$$

$$\lambda := \sum_{\ell \in [N]} \lambda_\ell e_\ell^{(N)}$$

and a scalar μ corresponding to the (actual plus virtual) maximum link utilization as building blocks for $$x := r \oplus p \oplus \pi \oplus \lambda \oplus \mu \in (R^n \oplus R^n \oplus R^N) \oplus (R^N \oplus R^N) \oplus (R^N \oplus R^N) \oplus R^N \oplus R \approx R^{n^2 N + N^2 + N^2 + N + 1} \quad \text{(Equation 7)}$$

Here, recall that direct sum of v and w is $v \oplus w := (v^T, w^T)^T$ and it is desired to express R3LP using x.

Before proceeding, the present disclosure offers a cautionary note: the presence of parallel links forces corresponding components of p to be equal. In one non-limiting embodiment, this is a crucial obstruction to dealing with parallel links that is discussed in Section 6.

4. BASIC ROUTING CONSTRAINTS

As a preliminary step, the present disclosure will first express Equation 5 in explicit matrix form. Towards this end, first note that $$\sum_{\ell: s(\ell)=j} r_{ab}(\ell) = \left( \sum_{\ell: s(\ell)=j} e_a^{(n)} \otimes e_b^{(n)} \otimes e_\ell^{(N)} \right) \cdot r, \quad \text{(Equation 8)}$$

immediately gives an implicit matrix form for (1a)-(1f) that is readily made explicit in silico as $$Rr = \zeta. \quad \text{(Equation 9)}$$

A similar equation $$Pp = \zeta \odot \sigma \quad \text{(Equation 10)}$$

encodes the requirement that p be a routing: here P is formed from columns of R corresponding to links with the appropriate multiplicity (ensuring that P has exactly $N^2$ columns), $\odot$ denotes the Hadamard or componentwise product, and a is a weight vector whose construction will be made explicit in a code snippet that is part of an example in this section.

The specification of R (up to signs of rows that are irrelevant and may be chosen freely) and ζ can be completed by proceeding through the scalar equations of (1) in order and subsequently eliminating trivial or redundant equations in the order they are encountered, so that $N_R \leq nN+n(n-1)(n-2)+2n(n-1)+2(n-1)N$ scalar equations remain, i.e. R is a $N_R \times n^2 N$ matrix and is a vector of dimension $N_R$. The bound on $N_R$ arises as follows: (1a) gives nN scalar equations; (1b) gives $n(n-1)(n-2)$ scalar equations (ignoring the possibility of sources/targets); (1c) and (1d) each give n(n−1) scalar equations, and portion of Equation 5 each give (n−1)N scalar equations.

There should be no problem with defining r when there are parallel links. However, there is a serious but subtle problem with defining p that is manifested by components of p that are structurally forced to be equal. The present disclosure elaborates on this point here.

Note that the source/target pairs (s($\ell$), t($\ell$)) are distinct if there are no parallel links. In this case only, regard E as a subset of $V^2$. In the event that there are parallel links, the notion of a "protection routing" as embodied by p becomes either ill-defined (unless all parallel links have the same capacity) or useless (since parallel links need not have the same capacity).

That is, the present disclosure should regard p as a function on E×E or on $V^2$×E. Both cases can apply if there are no parallel links, since then there is a bijection between E and the set of unique source/target pairs U:={(s($\ell$), t($\ell$)): $\ell \in$[N]}$\subseteq V^2$, and an embodiment of the present disclosure can regard p as a function on $V^2$×E which is zero outside of U×E. But if there are parallel links and only the first case applies, then the expression $p_s(\ell)t(\ell)$ ($\ell'$) cannot be assigned a consistent meaning unless it takes the same value for all parallel links $\ell$. But this is essentially the second case, and then the notion of the protection routing generally becomes useless, since there is then no way to completely account for parallel links with different capacities. The inextricability of the protection routing and link capacities is also latent in the matrix formulation of this section, which turns out to rest in an essential way on interpreting p as a function on E×E.

One exemplary tactic is to insert virtual vertices and links. However, this turns out to introduce new problems. For instance, suppose that every parallel link is split into two links joined at a virtual vertex. Then (as an embodiment of the present disclosure shall show in an example below) while this eliminates any internal inconsistency associated with p, it also introduces a degeneracy into R3LP that forces $\mu$>1, obliterating the non-congestion guarantee for $\mu$<1 that is at the heart of R3. Furthermore, experiments (detailed below) show that removing constraints (7c) and (7d) associated with either the "outgoing half" or "incoming half" of the new links does not fix this problem (which turns out to be due to entries of the form $p_\ell(\ell)$ that can be ignored when suitable care is taken).

It seems unlikely that more elaborate virtual topology schemes (e.g., splitting vertices) would succeed where the one sketched above fail. In any event, an embodiment of the present disclosure has searched for but have not found such a scheme that works. Additionally, while it is conceivable that simultaneously fusing parallel links and altering the rerouting virtual demand could be done in such a way as to address the case of F≤1 failures, it seems unlikely that such a strategy could ever work for F>1.

5. R3LP

R3LP is the linear program (for F a fixed positive integer)

$$\min_x \mu \text{ subject to} \quad \text{(Equation 11)}$$

r is a routing;

p is a routing;

-continued $$\sum_{a,b \in [n]} d_{ab} r_{ab}(\ell) + \sum_{\ell' \in [N]} \pi_\ell(\ell') + \lambda_\ell F - c_\ell \mu \leq 0;$$

$$c_{\ell'} p_{s(\ell')t(\ell')}(\ell) - \pi_\ell(\ell') - \lambda_\ell \leq 0;$$

$$\pi_\ell(\ell') \geq 0;$$

$$\lambda_\ell \geq 0.$$

Note that Equation 11 has obvious variants called in which semiroutings and restricted semiroutings are considered instead. Section 6 details some non-limiting requirements that r and p be routings (or their variants) in terms of matrices R and P, respectively.

The remaining details are as follows. Let $0_m$, $1_m$, and $\infty_m$ denote the column vectors with m entries all equal to 0, 1, or $\infty$, respectively; the present disclosure may also write, e.g., $0_m \equiv 0_{m \times 1}$, where $0_{m \times m'}$ is a m×m' matrix with all entries equal to zero. Define the block matrices $$A^{(=)} := \begin{pmatrix} R & 0_{N_R \times N^2} & 0_{N_R \times N^2} & 0_{N_R \times N} & 0_{N_R \times 1} \\ 0_{N_R \times n^2 N} & P & 0_{N_R \times N^2} & 0_{N_R \times N} & 0_{N_R \times 1} \end{pmatrix} \quad \text{(Equation 12)}$$

and $$A^{(\leq)} := \quad \text{(Equation 13)}$$

$$\begin{pmatrix} d^b \otimes I_N & 0_{N \times N^2} & I_N \otimes 1_N^T & FI_N & -c^\# \\ 0_{N^2 \times n^2 N} & \Delta(c^\#) \otimes I_N & -S & -I_N \otimes 1_N & 0_{N^2 \times 1} \end{pmatrix}$$

where $d^b := (d_{11}, d_{12}, \ldots, d_{nn})$, $I_N$ is the N-dimensional identity matrix, $c_\# := (c_1, c_2, \ldots, c_N)^T$, $\Delta$ denotes the diagonal operation, and S is an involuntary permutation matrix of dimension $N^2$ that effectively swaps edge indices à la $(\ell, \leftrightarrow')\ell(\ell, \ell)$ and that is conveniently defined as follows:

$$S_{jk} := \begin{cases} 1 & \text{if } k = N \cdot ((j-1) \mod N) + 1 + \left\lfloor \frac{j-1}{N} \right\rfloor \\ 0 & \text{otherwise.} \end{cases} \quad \text{(Equation 14)}$$

Writing $b^{(=)} := \zeta \square (\zeta \odot \sigma)$ and $u := 1_{n2N} \square 1_{N2 \oplus \infty N2 \oplus \infty N \oplus \infty}$, R3LP takes the form $$\min_x \mu \text{ subject to} \quad \text{(Equation 15)}$$

$$A^{(=)}x = b^{(=)};$$

$$A^{(\leq)}x \leq 0;$$

$$x \geq 0;$$

$$x \leq u.$$

For example, suppose that $N_R=16$ and $n^2N+N^2+N^2+N+1=34$, so that $A^{(=)}$ is a 32×34 matrix (or in the semirouting variant, a 8×34 matrix) that has already effectively been specified. Meanwhile, $N+N^2=12$, so $A^{(\leq)}$ is a 12×34 matrix, and embodiment of the present disclosure proceeds to detail each of its nonzero blocks.

For the first block row, there is $$d^b \otimes I_N = (d_{11}\ d_{12}\ d_{21}\ d_{22}) \otimes \begin{pmatrix} 1 & \cdot & \cdot \\ \cdot & 1 & \cdot \\ \cdot & \cdot & 1 \end{pmatrix} =$$

$$\begin{pmatrix} d_{11} & \cdot & \cdot & d_{12} & \cdot & \cdot & d_{21} & \cdot & \cdot & d_{22} & \cdot & \cdot \\ \cdot & d_{11} & \cdot & \cdot & d_{12} & \cdot & \cdot & d_{21} & \cdot & \cdot & d_{22} & \cdot \\ \cdot & \cdot & d_{11} & \cdot & \cdot & d_{12} & \cdot & \cdot & d_{21} & \cdot & \cdot & d_{22} \end{pmatrix};$$

$$I_N \otimes 1_N^T = \begin{pmatrix} 1 & \cdot & \cdot \\ \cdot & 1 & \cdot \\ \cdot & \cdot & 1 \end{pmatrix} \otimes (1\ 1\ 1) = \begin{pmatrix} 1 & 1 & 1 & \cdot & \cdot & \cdot & \cdot & \cdot & \cdot \\ \cdot & \cdot & \cdot & 1 & 1 & 1 & \cdot & \cdot & \cdot \\ \cdot & \cdot & \cdot & \cdot & \cdot & \cdot & 1 & 1 & 1 \end{pmatrix};$$

$$FI_N = \begin{pmatrix} F & \cdot & \cdot \\ \cdot & F & \cdot \\ \cdot & \cdot & F \end{pmatrix};$$

$$-c^\# = \begin{pmatrix} -c_1 \\ -c_2 \\ -c_3 \end{pmatrix}.$$

For the second block row, there is $$\Delta(c^\#) \otimes I_N =$$

$$\begin{pmatrix} c_1 & \cdot & \cdot \\ \cdot & c_2 & \cdot \\ \cdot & \cdot & c_3 \end{pmatrix} \otimes \begin{pmatrix} 1 & \cdot & \cdot \\ \cdot & 1 & \cdot \\ \cdot & \cdot & 1 \end{pmatrix} = \begin{pmatrix} c_1 & \cdot & \cdot & \cdot & \cdot & \cdot & \cdot & \cdot & \cdot \\ \cdot & c_1 & \cdot & \cdot & \cdot & \cdot & \cdot & \cdot & \cdot \\ \cdot & \cdot & c_1 & \cdot & \cdot & \cdot & \cdot & \cdot & \cdot \\ \cdot & \cdot & \cdot & c_2 & \cdot & \cdot & \cdot & \cdot & \cdot \\ \cdot & \cdot & \cdot & \cdot & c_2 & \cdot & \cdot & \cdot & \cdot \\ \cdot & \cdot & \cdot & \cdot & \cdot & c_2 & \cdot & \cdot & \cdot \\ \cdot & \cdot & \cdot & \cdot & \cdot & \cdot & c_3 & \cdot & \cdot \\ \cdot & \cdot & \cdot & \cdot & \cdot & \cdot & \cdot & c_3 & \cdot \\ \cdot & \cdot & \cdot & \cdot & \cdot & \cdot & \cdot & \cdot & c_3 \end{pmatrix}.$$

The following table gives the nonzero entries of S:

| j | 1 | 2 | 3 | 4 | 5 | 6 | 7 | 8 | 9 |
|---|---|---|---|---|---|---|---|---|---|
| $N \cdot ((j-1) \bmod N)$ | 0 | 3 | 6 | 0 | 3 | 6 | 0 | 3 | 6 |
| $1 + \left\lfloor \frac{j-1}{N} \right\rfloor$ | 1 | 1 | 1 | 2 | 2 | 2 | 3 | 3 | 3 |
| $k = N \cdot ((j-1) \bmod N) + 1 + \left\lfloor \frac{j-1}{N} \right\rfloor$ | 1 | 4 | 7 | 2 | 5 | 8 | 3 | 6 | 9 |

That is, $$-S = \begin{pmatrix} -1 & \cdot & \cdot & \cdot & \cdot & \cdot & \cdot & \cdot & \cdot \\ \cdot & \cdot & \cdot & -1 & \cdot & \cdot & \cdot & \cdot & \cdot \\ \cdot & \cdot & \cdot & \cdot & \cdot & \cdot & -1 & \cdot & \cdot \\ \cdot & -1 & \cdot & \cdot & \cdot & \cdot & \cdot & \cdot & \cdot \\ \cdot & \cdot & \cdot & \cdot & -1 & \cdot & \cdot & \cdot & \cdot \\ \cdot & \cdot & \cdot & \cdot & \cdot & \cdot & \cdot & -1 & \cdot \\ \cdot & \cdot & -1 & \cdot & \cdot & \cdot & \cdot & \cdot & \cdot \\ \cdot & \cdot & \cdot & \cdot & \cdot & -1 & \cdot & \cdot & \cdot \\ \cdot & \cdot & \cdot & \cdot & \cdot & \cdot & \cdot & \cdot & -1 \end{pmatrix}.$$

Finally, $$-I_N \otimes 1_N = -\begin{pmatrix} 1 & \cdot & \cdot \\ \cdot & 1 & \cdot \\ \cdot & \cdot & 1 \end{pmatrix} \otimes \begin{pmatrix} 1 \\ 1 \\ 1 \end{pmatrix} = \begin{pmatrix} -1 & \cdot & \cdot \\ -1 & \cdot & \cdot \\ -1 & \cdot & \cdot \\ \cdot & -1 & \cdot \\ \cdot & -1 & \cdot \\ \cdot & -1 & \cdot \\ \cdot & \cdot & -1 \\ \cdot & \cdot & -1 \\ \cdot & \cdot & -1 \end{pmatrix}.$$

Thus, $A^{(\leq)}$ is the matrix $$\begin{pmatrix} d_{11} & . & d_{12} & . & d_{12} & . & d_{21} & . & d_{21} & . & d_{22} & . & d_{22} & . & . & . & . & . & . & . & . & . & . & . & . & . & . & . & . & . \\ . & d_{11} & . & d_{12} & . & d_{21} & . & d_{12} & . & d_{22} & . & d_{21} & . & d_{22} & . & . & . & . & . & . & . & . & . & . & . & . & . & . & . & . \\ . & . & . & . & . & . & . & . & . & . & . & . & . & . & c_1 & . & . & . & . & . & . & . & . & . & . & . & . & . & . & . \\ . & . & . & . & . & . & . & . & . & . & . & . & . & c_1 & . & . & . & . & . & . & . & . & . & . & . & . & . & . & . & . \\ . & . & . & . & . & . & . & . & . & . & . & . & . & . & . & c_1 & . & . & . & . & . & . & . & . & . & . & . & . & . & . \\ . & . & . & . & . & . & . & . & . & . & . & . & . & . & . & . & c_2 & . & . & . & . & . & . & . & . & . & . & . & . & . \\ . & . & . & . & . & . & . & . & . & . & . & . & . & . & . & . & . & c_2 & . & . & . & . & . & . & . & . & . & . & . & . \\ . & . & . & . & . & . & . & . & . & . & . & . & . & . & . & . & . & . & c_2 & . & . & . & . & . & . & . & . & . & . & . \\ . & . & . & . & . & . & . & . & . & . & . & . & . & . & . & . & . & . & . & c_3 & . & . & . & . & . & . & . & . & . & . \\ . & . & . & . & . & . & . & . & . & . & . & . & . & . & . & . & . & . & . & . & c_3 & . & . & . & . & . & . & . & . & . \\ . & . & . & . & . & . & . & . & . & . & . & . & . & . & . & . & . & . & . & . & . & c_3 & . & . & . & . & . & . & . & . \\ 1 & 1 & 1 & . & . & . & -1 & . & . & . & . & . & . & . & . & . & . & -1 & . & . & . & . & . & . & . & . & . & . & . & . \\ . & . & . & 1 & 1 & 1 & . & -1 & . & . & . & . & . & . & . & . & . & . & -1 & . & . & . & . & . & . & . & . & . & . & . \\ . & . & . & . & . & . & 1 & 1 & 1 & . & . & . & . & -1 & . & . & . & . & . & . & . & . & . & . & . & -1 & . & . & . & . \\ . & . & . & . & . & . & . & . & . & 1 & 1 & 1 & . & . & . & . & -1 & . & . & . & . & . & . & . & . & . & . & -1 & . & . \\ . & . & . & . & . & . & . & . & . & . & . & . & 1 & 1 & 1 & . & . & . & . & . & -1 & . & . & . & . & . & . & . & -1 & . \\ F & . & . & . & . & . & . & . & . & . & . & . & . & . & . & -1 & -1 & -1 & . & . & . & . & . & . & . & . & . & . & . & -1 \\ . & F & . & . & . & . & . & . & . & . & . & . & . & . & . & . & . & . & -1 & -1 & -1 & . & . & . & -c_1 \\ . & . & F & . & . & . & . & . & . & . & . & . & . & . & . & . & . & . & . & . & . & -1 & -1 & -1 & -c_2 \\ . & . & . & F & . & . & . & . & . & . & . & . & . & . & . & . & . & . & . & . & . & . & . & . & -c_3 \end{pmatrix}$$

Thus $A^{(\leq)}$ is the matrix

Continuing, with
$r=(r_{11}(1), r_{11}(2), r_{11}(3), r_{12}(1), r_{12}(2), r_{12}(3), r_{21}(1), r_{21}(2), r_{21}(3), r_{22}(1), r_{22}(2), r_{22}(3))^T$,
$p=(p_{12}(1), p_{12}(2), p_{12}(3), p_{12}(1), p_{12}(2), p_{12}(3), p_{21}(1), p_{21}(2), p_{21}(3))^T, \pi_3(2), \pi_3(3))^T$,
$\pi=(\pi_1(1), \pi_1(2), \pi_1(3), \pi_2(1), \pi_2(2), \pi_2(3), \pi_3(1)$,
$\lambda=(\lambda_1, \lambda_2, \lambda_3)^T$,
$x=r\oplus p\oplus \pi\oplus \lambda\oplus \mu$
it is finally obtained that the twelve explicit scalar equations corresponding to $A(\leq)x\leq 0$, viz.

$$d_{11}r_{11}(1) + d_{12}r_{12}(1) + d_{21}r_{21}(1) +$$
$$d_{22}r_{22}(1) + \pi_1(1) + \pi_1(2) + \pi_1(3) + \lambda_1 F - c_1\mu \leq 0;$$
$$d_{11}r_{11}(2) + d_{12}r_{12}(2) + d_{21}r_{21}(2) + d_{22}r_{22}(2) +$$
$$\pi_2(1) + \pi_2(2) + \pi_2(3) + \lambda_2 F - c_2\mu \leq 0;$$
$$d_{11}r_{11}(3) + d_{12}r_{12}(3) + d_{21}r_{21}(3) + d_{22}r_{22}(3) +$$
$$\pi_3(1) + \pi_3(2) + \pi_3(3) + \lambda_3 F - c_3\mu \leq 0;$$
$$c_1 p_{12}(1) - \pi_1(1) - \lambda_1 \leq 0;$$
$$c_1 p_{12}(2) - \pi_2(1) - \lambda_1 \leq 0;$$
$$c_1 p_{12}(3) - \pi_3(1) - \lambda_1 \leq 0;$$
$$c_2 p_{12}(1) - \pi_1(2) - \lambda_2 \leq 0;$$
$$c_2 p_{12}(2) - \pi_2(2) - \lambda_2 \leq 0;$$
$$c_2 p_{12}(3) - \pi_3(2) - \lambda_2 \leq 0;$$
$$c_3 p_{21}(1) - \pi_1(3) - \lambda_3 \leq 0;$$
$$c_3 p_{21}(2) - \pi_2(3) - \lambda_3 \leq 0;$$
$$c_3 p_{21}(3) - \pi_3(3) - \lambda_3 \leq 0;$$

The first three of these are readily seen to be the same as first portion of Equation 11, and the last nine are readily seen to be the same as last portion of Equation 11.

This example may leave a quandary regarding parallel links. If parallel links are present, the protection routing is ill-defined. If parallel links are "virtualized away," the equations lose (at least) the non-congestion guarantees of R3, even if the equations weaken R3LP by eliminating the only constraints that could plausibly be ignored.

The underlying degeneracy that is introduced by topology virtualization turns out to be protection routing values of the form $p\ell(\ell)=1$. For $\mu\leq 1$ on the original topology, an equality $p\ell(\ell)=1$ "implies that link $[\ell]$ carries no actual demand from OD pairs of virtual demand from links other than $[\ell]$. So link ($\ell$) does not need to be protected and can be safely ignored."

With this in mind, the present disclosure can evaluate the maximum load M L(p, $\ell'$) given as the optimal objective to $$\max_z \sum_\ell z_\ell p_\ell(\ell') \text{ subject to} \qquad \text{(Equation 16)}$$
$$z_\ell \leq c_\ell;$$
$$\sum_\ell z_\ell / c_\ell \leq F$$

With protection routing values of the form $p\ell(\ell)=1$ either left unchanged or reset to zero and compare these results with the dual objective $$\Sigma \ell \pi \ell.(\ell)+\lambda \ell.F. \qquad \text{(Equation 17)}$$

A processor executes the following exemplary MATLAB instructions:

```
R3evl = R3EvalVirtualLoad(cap,d,F,r31p)
[r3evl.1u,r3evl.unitDiagProtect,r3evl.noUnitDiagProtect, r3evl.dual]
``` which shows that although $\mu=1.2$, a unit contribution to this term comes from ignorable diagonal protection routing values: the "real" value after virtualization is r3evl.muNoUnitDiagProtect, which takes the value $0.02\leq 1$, so that embodiment of the present disclosure recaptures a guarantee of congestion-free routing.

6. R3 ONLINE RECONFIGURATION

With the offline precomputation for R3 addressed, the present disclosure now turns to the online reconfiguration. Define $$\xi_{(\ell)} := \sum_{\ell' \in [N]\setminus\{\ell\}} \xi_\ell(\ell') \cdot e_\ell^{(N)} \otimes e_{\ell'}^{(N)} \qquad \text{(Equation 18)}$$

where $$\xi_\ell(\ell') := \begin{cases} 0 & \text{if } p_{s(e_\ell)t(e_\ell)}(\ell) = 1; \\ \dfrac{p_{s(e_\ell)t(e_\ell)}(\ell')}{1 - p_{s(e_\ell)t(e_\ell)}(\ell)} & \text{otherwise.} \end{cases} \qquad \text{(Equation 19)}$$

A failure of link $\ell$ (suggestively indicated by $\ell\downarrow$) updates the base routing r and protection routing p as follows:

$$r = \sum_{\substack{a,b\in[n] \\ a\neq b \\ \ell'\in[N]}} r_{ab}(\ell') \cdot e_a^{(n)} \otimes e_b^{(n)} \otimes e_{\ell'}^{(N)} \stackrel{\ell\downarrow}{\mapsto} \qquad \text{(Equation 20)}$$

$$r' := \sum_{\substack{a,b\in[n] \\ a\neq b \\ \ell'\in[N]\setminus\{\ell\}}} [r_{ab}(\ell') + r_{ab}(\ell)\cdot\xi_\ell(\ell')] \cdot e_a^{(n)} \otimes e_b^{(n)} \otimes e_{\ell'}^{(N)};$$

and $$p = \sum_{\ell',\ell''\in[N]} p_{s(e_{\ell'})t(e_{\ell'})}(\ell'') \cdot e_{\ell'}^{(N)} \otimes e_{\ell''}^{(N)} \stackrel{\ell\downarrow}{\mapsto} \qquad \text{(Equation 21)}$$

$$p' := \sum_{\ell',\ell''\in[N]\setminus\{\ell\}} \left[ p_{s(e_{\ell'})t(e_{\ell'})}(\ell'') + p_{s(e_{\ell'})t(e_{\ell'})}(\ell)\cdot\xi_\ell(\ell'') \right] \cdot$$
$$e_{\ell'}^{(N)} \otimes e_{\ell''}^{(N)}.$$

While the tensor notation might make these updates look intimidating, it reduces complexity in silico and facilitates insight in concert with the corresponding graphical notation.

Figure 2:
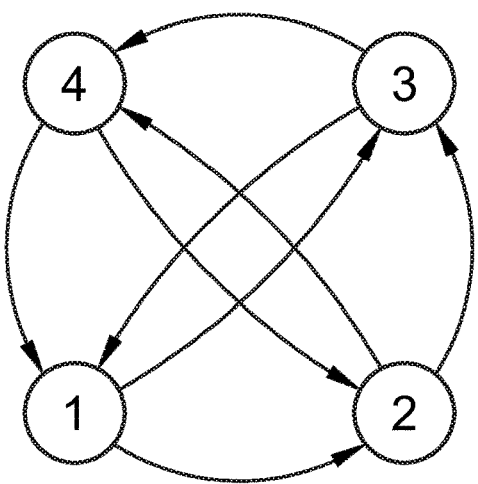
FIG. 2 (FIG. 2) is a diagram of a generic network indicating four nodes connected by links or edges.

FIG. 2 depicts a routing r where reference elements 1, 2, 3, and 4 indicated edge indices. In FIG. 2, G: n=4 and N=8. Unit link capacities, a traffic matrix with all entries equal to 0.1, and consider F=1 potential failures per the following MATLAB sequence:

```
n = 4;
E = [1,2;1,3;2,3;2,4;3,1;3,4;4,1;4,2];
N = size(E,1);
cap = ones(N,1);
d = 0.1*ones(n);       % allow loopback demand to see sparsity
F = 1;                 % number of allowed link failures
```

-continued

```
semiFlag = 1;
symFlag = 0;
r3Ip = R3LP(n,E,cap,d,F,semiFlag,symFlag)
``` which yields an, optimization with $\mu=0.7$ (corresponding to an actual MLU of \$0.2\$, achieved on all links as demonstrated by looking at the output of R3LinkUtil(cap,d,r3lp)}).

FIG. 2 depicts the base routing r. Recall that an edge of G corresponds to a basis vector, which in turn gives meaning to weights such as the factor of ½ appearing for $r_{14}$. That is, traffic from node 1 to node 4 takes either of the two routes 1→2→4 or 1→3→4 with a probability ½.

7. WIRELESS FORMALISM

A formalism for wireless networks requires the capability to describe point-to-multipoint (P2MP) transmission. Towards this end, the present disclosure introduces some notation before giving an example. Let $E_j:=(\ell: s(\ell)=j)$ be the set of edges with source vertex j. For $\Gamma_j \in N$, let $y_j: E_j \to [\Gamma_j]$ be a surjective function: for each $g \in \Gamma_j$, the pre-image $\gamma_j^{-1}(g)$ is the set of edges belonging to the gth (P2MP) group at vertex j. A group of cardinality one corresponds to a dedicated point-to-point (P2P) transmission.

Figure 3:
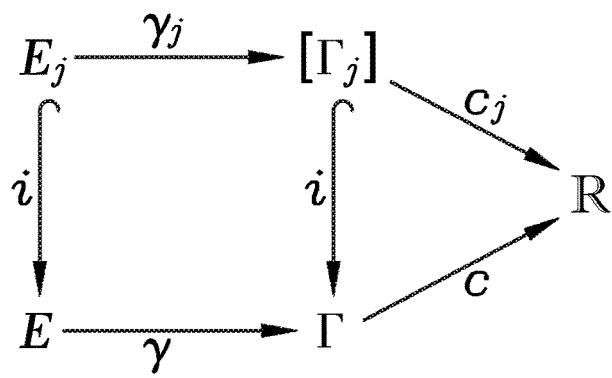
FIG. 3 (FIG. 3) is a diagram with edges labeled by functions such that function compositions corresponding to paths with the same source and target give the same results.

FIG. 3 represents a schematic of the protocol of the present disclosure noting that $E = \uplus_j E_j$ and writing $\Gamma := \uplus_j \{j\} \times [\Gamma_j]$), the present disclosure can summarize the additional structure for P2MP transmission in the commutative diagram of FIG. 3 (i.e., a digraph with edges labeled by functions such that function compositions corresponding to paths with the same source and target give the same results), where in FIG. 3 i represents a generic inclusion map. Here the group capacity is given in terms of a family of vertex-specific maps $c_j$ via $c(j, g) \ c_j(g)$ and for $\ell \in E_j$ there is $\gamma(\ell) := (j, \gamma_j(\ell))$.

FIG. 4 depicts the underlying digraph G and P2MP groups of a network in which the communications between three fixed terrestrial nodes, a ship, a plane, and a satellite are depicted. In FIG. 4, G: n=6 and N=16. Vertices 1-3 represent interconnected fixed terrestrial sites, with vertex 3 as a coastal communication station; vertex 4 represents a ship (over the horizon from the station at vertex 3), vertex 5 represents a plane (within range of the station and ship), and vertex 6 represents an overhead satellite.

By inspection, it is seen that $\Gamma_1=2=E_1$, $\Gamma_2=2=E_2$, $\Gamma_3=3<E_3=4$, $\Gamma_4=1<E_4=2$, $\Gamma_5=1<E_5=3$, and $\Gamma_6=1<E_6=3$. Assuming that in the absence of parallel edges the edge indices correspond to the lexicographical ordering of source/target pairs, the maps $y_j$ are (w/l/o/g) given by $$\gamma_1^{x2}(1,2)=(1,2);$$

$$\gamma_2^{x2}(3,4)=(1,2);$$

$$\gamma_3^{x4}(5,6,7,8)=(1,2,3,3);$$

$$\gamma_4^{x2}(9,10)=(1,1);$$

$$\gamma_5^{x3}(11,12,13)=(1,1,1);$$

$$\gamma_6^{x3}(14,15,16)=(1,1,1).$$

The lexicographic ordering on edge carries over to elements of $\Gamma$, and $c^{xN}(1, \ldots, N)$ equals $(c_1(1), c_1(2), c_2(1), c_2(2), c_3(1), c_3(2), c_3(3), c_3(3), c_4(1), c_4(1), c_5(1), c_5(1), c_5(1), c_6(1), c_6(1), c_6(1))$.

The Wireless Constraint

Absent parallel links, the additional constraint imposed by wireless communications may be written as:

$$\sum_{\ell \in \gamma_j^{-1}(g)} d_{jt(\ell)} r_{jt(\ell)}(\ell) \leq c_j(g), g \in [\Gamma_j], |\gamma_j^{-1}(g)| > 1. \quad \text{(Equation 22)}$$

(The requirement $|\gamma^{-1}(g)|>1$ is imposed to avoid redundancy.)

The presence of parallel links introduces a significant complication which is illustrated through an example. Consider G as in FIG. 5A. There is $\gamma_1^{-1}(1)=\{1, 3, 5\}$, $\gamma_1^{-1}(2)=\{2, 4, 7\}$, and $\gamma_1^{-1}(3)=\{6, 8, 9\}$. T an these yield the following instances of (Equation 22):

$$d_{12}r_{12}(1)+d_{13}r_{13}(3)+d_{15}r_{15}(5) \leq c_1(1);$$

$$d_{12}r_{12}(2)+d_{14}r_{14}(4)+d_{16}r_{16}(7) \leq c_1(2);$$

$$d_{15}r_{15}(6)+d_{16}r_{16}(8)+d_{17}r_{17}(9) \leq c_1(3);$$

$$d_{18}r_{18}(10) \leq c_1(4).$$

Figure 5A:
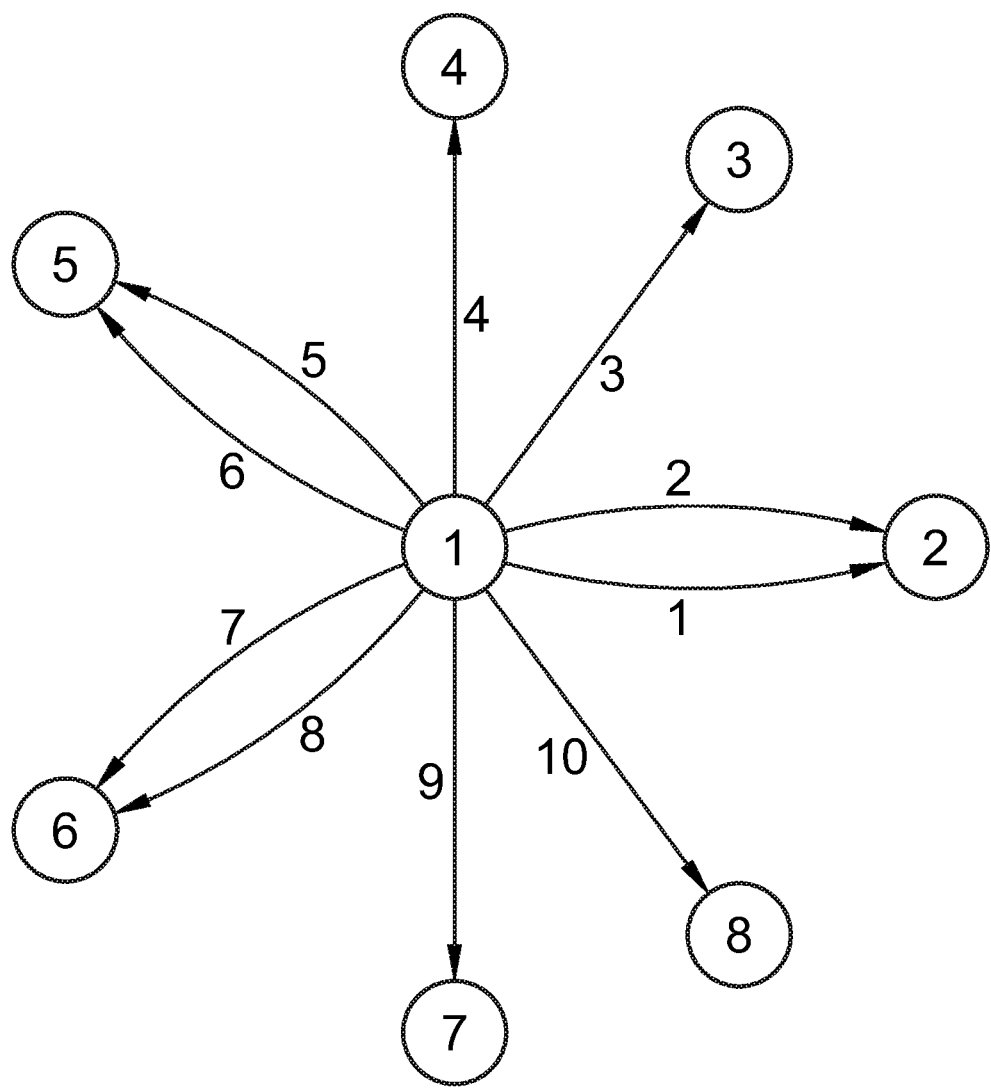
FIG. 5A (FIG. 5A) is a diagram of a point-to-point network with a central node connected with seven other nodes via two types of links.

FIG. 5A provides that G: n=8 and N=10. Edges are ordered counterclockwise starting at the edge labeled 1 from vertex 1 to vertex 2 (note that this is one of 23 possible lexicographic orderings. There is $\Gamma1=4$ and yx10 $(1, \ldots, 10)=(1, 2, 1, 2, 1, 3, 2, 3, 3, 4)$. After virtualization, there are no parallel edges, so the system orders the edges lexicographically by the source/target pair. This effectively reorders the edges in E1, so that now yx10$(1, \ldots, 10)=(1, 2, 3, 4, 1, 2, 1, 3, 2, 3)$. Virtualization adds vertices after n=8, with the (now unique) convention that edges are ordered lexicographically. Thus (referencing the right panel of 8) the preceding constraints correspond after virtualization to $$d_{12}r_{12}(5)+d_{13}r_{13}(1)+d_{15}r_{15}(7) \leq c_1(1);$$

$$d_{12}r_{12}(6)+d_{14}r_{14}(2)+d_{16}r_{16}(9) \leq c_1(2);$$

$$d_{15}r_{15}(8)+d_{16}r_{16}(10)+d_{17}r_{17}(3) \leq c_1(3);$$

$$d_{18}r_{18}(4) \leq c_1(4).$$

This reordering can be tracked as follows via MATLAB code:

```
%% Original network structure
N = 8;
E = [1,2,,1,2;1,3;1,4;1,5;1,5;1,6;1,7;1,8];
N = size (E,1);
gamma0{1} = [1;2;1;2;1;3;2;3;3;4];
cap = .01*gamma0{1}; % consistent
d = zeros(n); d(1,2:n) = .01;
%% Virtualization
tv = topologyvirtualization(n,E,cap,d);
[~,sigma] = sort(tv.orig(1:N)); % sigma = [5;6;1;2;7;8;9;10;3;4]
gamma1{1} = gamma0{1}(tv.orig(1:N)); % gamma1[1;2;3;4;1;2;1;3;2;3]
GENERALIZED WIRELESS CONSTRAINT
```

The example above illustrates that if the present disclosure use $\sigma^{-1}$ to denote the permutation corresponding to tv.orig(1:N), then the generalization of (17) to incorporate parallel edges is $$\sum_{\ell \in \gamma_j^{-1}(g)} d_{jt(\ell)} r_{jt(\ell)}(\sigma(\ell)) \leq c_j(g), g \in [\Gamma_j], |\gamma_j^{-1}(g)| > 1. \quad \text{(Equation 23)}$$

Equation 23 accounts for list maintenance if there are parallel links in the communication network. Care must be taken in the interpretation of each side of (23): the vertex and edge indices refer to the original topology, but the indexed objects themselves (in particular, the routing r) are defined for the virtualized topology. Note that if there are no parallel edges in the original topology, then o⁻ is the identity permutation (and the function topology virtualization simply copies its arguments), so Equation 23 does in fact generalize Equation 22.

Recall FIG. 4 and consider the following MATLAB command sequence:

```
N = 6;
E = [1,2;1,3;2,1;2,3;3,1;3,2;3,5;3,6;4,5;4,6;5,3;5,4;5,6;6,4;6,5];
gamma = [1;2;1;2;1;2;3;3;1;1;1;1;1;1;1];
cap = 0.1*gamma;
d = 1e-4*ones(n);
wc = wirelessconstraint(n,#,cap,d,gamma)
%% Display nontrivial wireless constraint indices
for j = 1:n
   for g = 1:numel(wc.ind{j})
      if numel(wc.ind{j}{g})
         [j,g]
         wc.ind{j}{g} % rows = [j,t(ell),sigma(ell)]
      end
   end
end
```

Figure 5B:
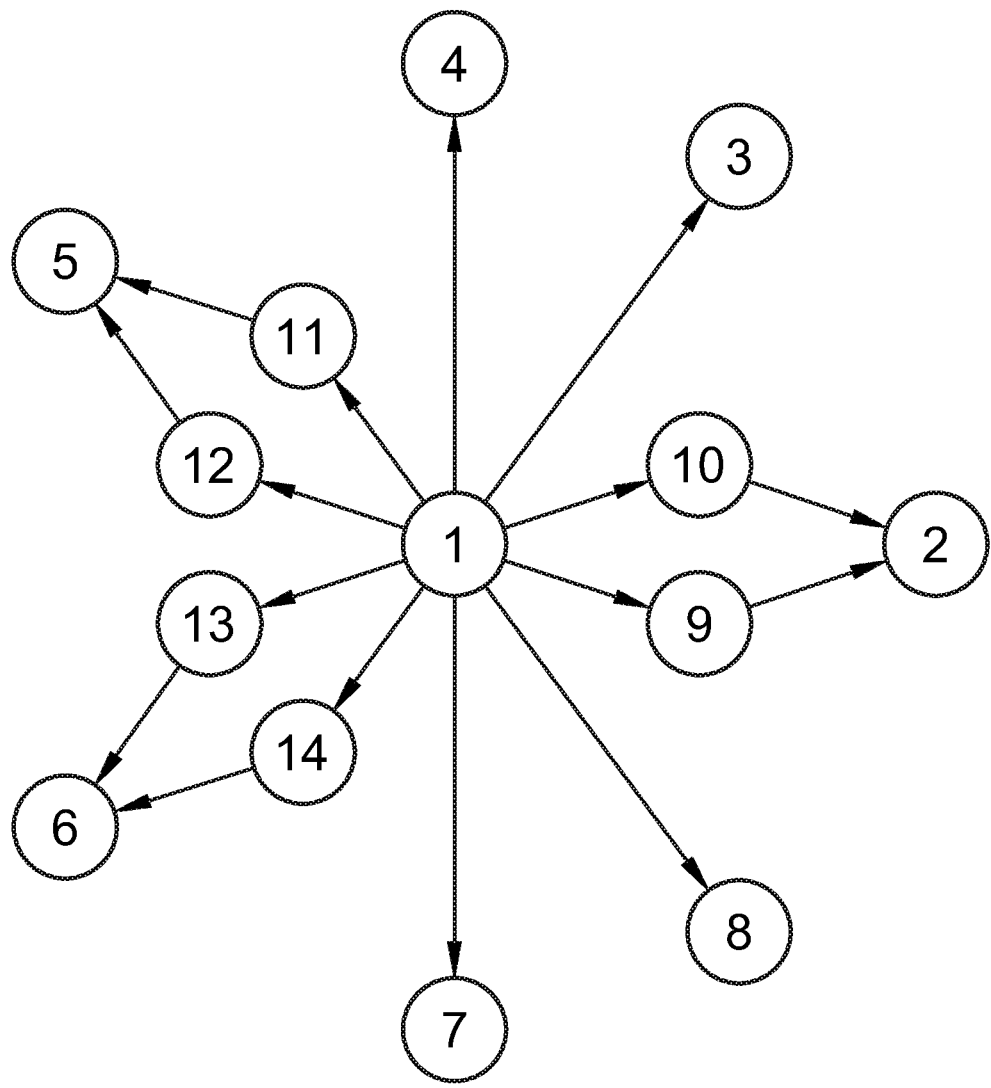
FIG. 5B (FIG. 5B) is a network depicting an exemplary point-to-multipoint network.

This indicates the following nontrivial wireless constraints which are easily verified by hand:

$d_{35}r_{35}(7)+d_{36}r_{36}(8) \leq c_3(3);$ $d_{45}r_{45}(9)+d_{46}r_{46}(10) \leq c_4(1);$ $d_{53}r_{53}(11)+d_{54}r_{54}(12)+d_{56}r_{56}(13) \leq c_5(1);$ $d_{63}r_{63}(14)+d_{64}r_{64}(15)+d_{65}r_{65}(16) \leq c_6(1).$ Likewise, recall FIG. 5A and FIG. 5B and consider

```
n = 8;
E = [1,2;1,2;1,3;1,4;1,5;1,5;1,6;1,6;1,7;1,8];
gamma = [1;2;1;2;1;3;2;3;3;4];
cap = .01*gamma;
d = zeros(n); d(1,2:n) = .01;
wc = wirelessconstraint(n,E,cap,d,gamma)
%% Display nontrivial wireless constraint indices
for j = 1:n
   for g = 1:numel(wc.ind{j}{g})
      if numel(wc.ind{j}{g}
         [j,g]
         wc.ind{j}{g} % rows = [j,t(ell),sigma(ell)]
      end
   end
end
```

This reproduces the constraints shown before. The function wireless constraint also produces a matrix block and corresponding vector encoding all of the instances of Equation 23.

7. WR3LP

Combing Equation 11 and Equation 23 yields a linear program which the present disclosure identifies as WR3LP. As an example of WR3LP in action, recall once again FIG. 4. Suppose that the capacities of the edges are 1 Gbps and the other groups are $10^{-2}$ Gbps, with the exception of the P2MP group at vertex 6, which is $\alpha \cdot 10^{-2}$ Gbps, for $0 < \alpha \leq 1$. Let the demand matrix be (in units of Gbps)

$$\begin{pmatrix} \cdot & 10^{-1} & \cdot & 10^{-3} & 10^{-3} & \cdot \\ 10^{-1} & \cdot & \cdot & 10^{-3} & 10^{-3} & \cdot \\ \cdot & \cdot & \cdot & \cdot & \cdot & \cdot \\ 10^{-3} & 10^{-3} & \cdot & \cdot & 10^{-3} & \cdot \\ 10^{-3} & 10^{-3} & \cdot & 10^{-3} & \cdot & \cdot \\ \cdot & \cdot & \cdot & \cdot & \cdot & \cdot \end{pmatrix}.$$

This can simulate this scenario for up to F=1 failures. An exemplary adaptation of the plotting command results are shown in FIG. 6.

In FIG. 6, individual, and maximum link utilizations for varying a and failed link $\ell$, indicated by $\ell \downarrow$ on the left. All plots are displayed over the unit square: the row gives the failed link, and the column gives the active link (or the maximum over all links on the right). The utilization before a link failure is shown in a first line and the utilization after reconfiguring is shown in as a second line. Note that the "terrestrial" edges from FIG. 4 are excluded from the figure in the interest of space, as this qualitative behavior is essentially trivial.

The basic behavior is entirely expected: if a link of the form (a,5) (resp., (a,6)) fails, traffic is rerouted on link (a,6) (resp., (a,5)); similarly, if (5,b) (resp., (6,b)) fails, traffic is rerouted on link (6,b) resp., (5,b)). For $\alpha \ll 1$, the failures of links (3,5), (4,5), (5,3), or (5,4) will lead to congestion as the wireless group at vertex 6 becomes overwhelmed.

Figure 7:
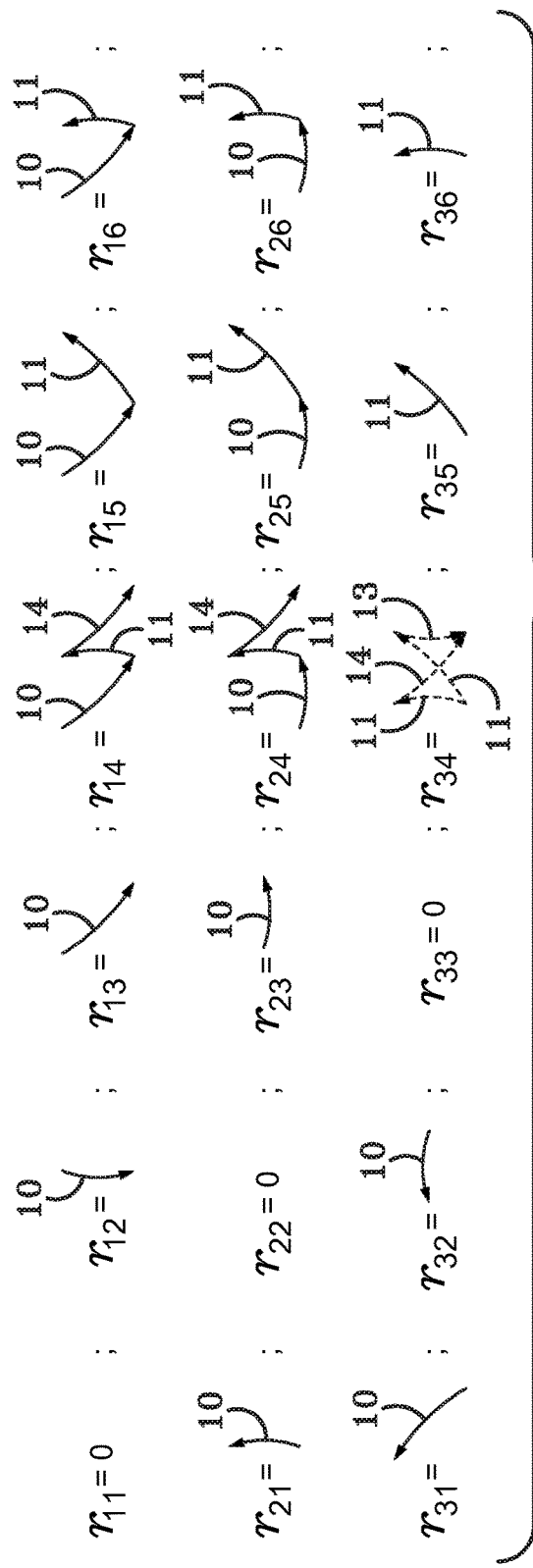
FIG. 7 (FIG. 7) is an exemplary routing protocol for the links from nodes 1-3 of FIG. 4.

Since it happens that for $\alpha=1$, $r_{ab}(\ell)$ 0, ½,1), FIG. 7 depicts the base routing as before, keeping the scheme of FIG. 4 to disambiguate edges.

Figure 8:
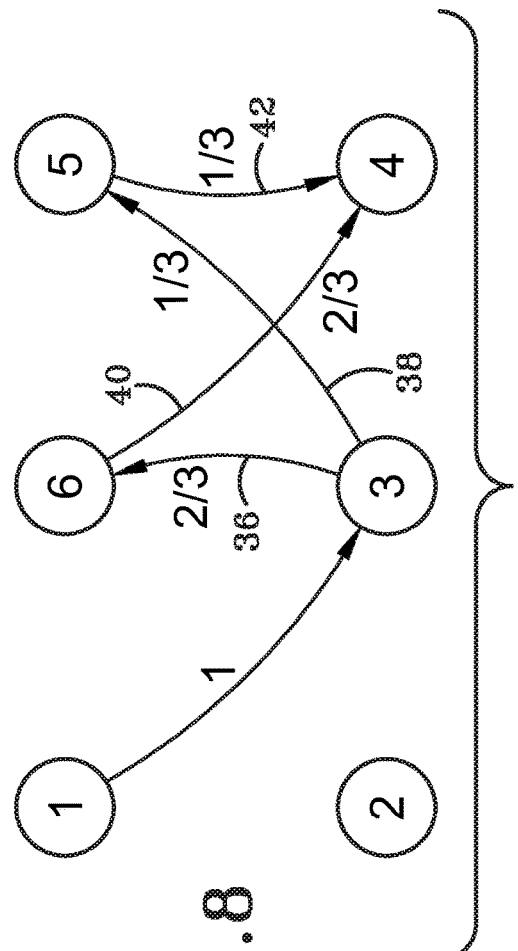
FIG. 8 (FIG. 8) is a diagram of the nodes of FIG. 4 having different weighted values from the links stemming from node 3 and received into node 4.

FIG. 8 provides $r_{14}$ for $a=½$ with edge weights explicitly shown. $r_{24}$, $r_{41}$, and $r_{42}$ are related by obvious symmetries; otherwise $r_{ab}$ is the same as in the case of a=1. Edge or link 36 from node 3→node 6 is weight ⅔ and the edge or link 38 from node 3→node 5 is weighted ⅓. Edge or link 40 from node 6→node 4 is weight ⅔ and the edge or link 42 from node 5→node 4 is weighted ⅓.

Figure 9:
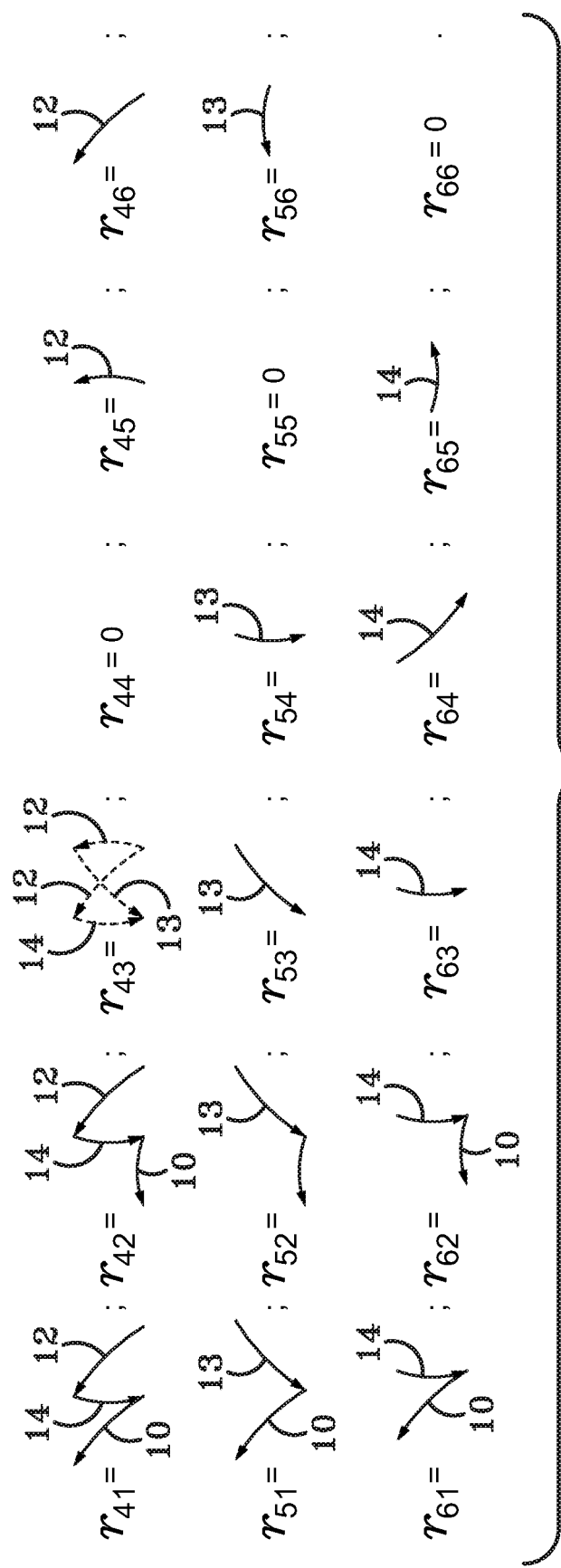
FIG. 9 (FIG. 9) is an exemplary routing protocol for the links from nodes 1-3 of FIG. 4.

FIG. 9 depicts a base routing schematic and identifies that for $\alpha=½$ the only change to the base routing is for the origin/destination pairs (1,4), (2,4), (4,1), and (4,2). Since these are essentially all the same up to symmetries, embodiment of the present disclosure show in this case only $r_{14}$ in FIG. 8. It is evident that the initial effect of decreasing a from 1 is to shift traffic that would originally have traverse vertex 6 through vertex 5 instead, exactly as would be expected.

Given a capacity function c such s that in FIG. 10, one exemplary embodiment may define a simple but reasonable model of traffic demand as follows. First, define a probability distribution P on V using the well-known PageRank for weighted directed multigraphs. Second, choose some D « 1 and define the model demand $d_{ab}:=D \cdot (\sum_{\ell\; :s(\ell)=a} c_\ell) \cdot \mathbb{P}(b)$ via $$\frac{d_{ab}}{\Sigma_{b'} d_{ab'}} = \mathbb{P}(b); \sum_b d_{ab} = D \sum_{\ell:s(\ell)=a} c_\ell. \quad \text{(Equation 24)}$$

Note that $$P_{ab} := \frac{d_{ab}}{\Sigma_{b'} d_{ab'}}$$

are the entries of a row-stochastic matrix. Thus the first equation in Equation 24 embodies the intuition that P is an equilibrium measure for the Markov chain defined by P, which is broadly consistent with the idea behind PageRank. Meanwhile, the second equation in Equation 24 above identifies that outbound demand is proportional to outbound capacity.

Figure 11:
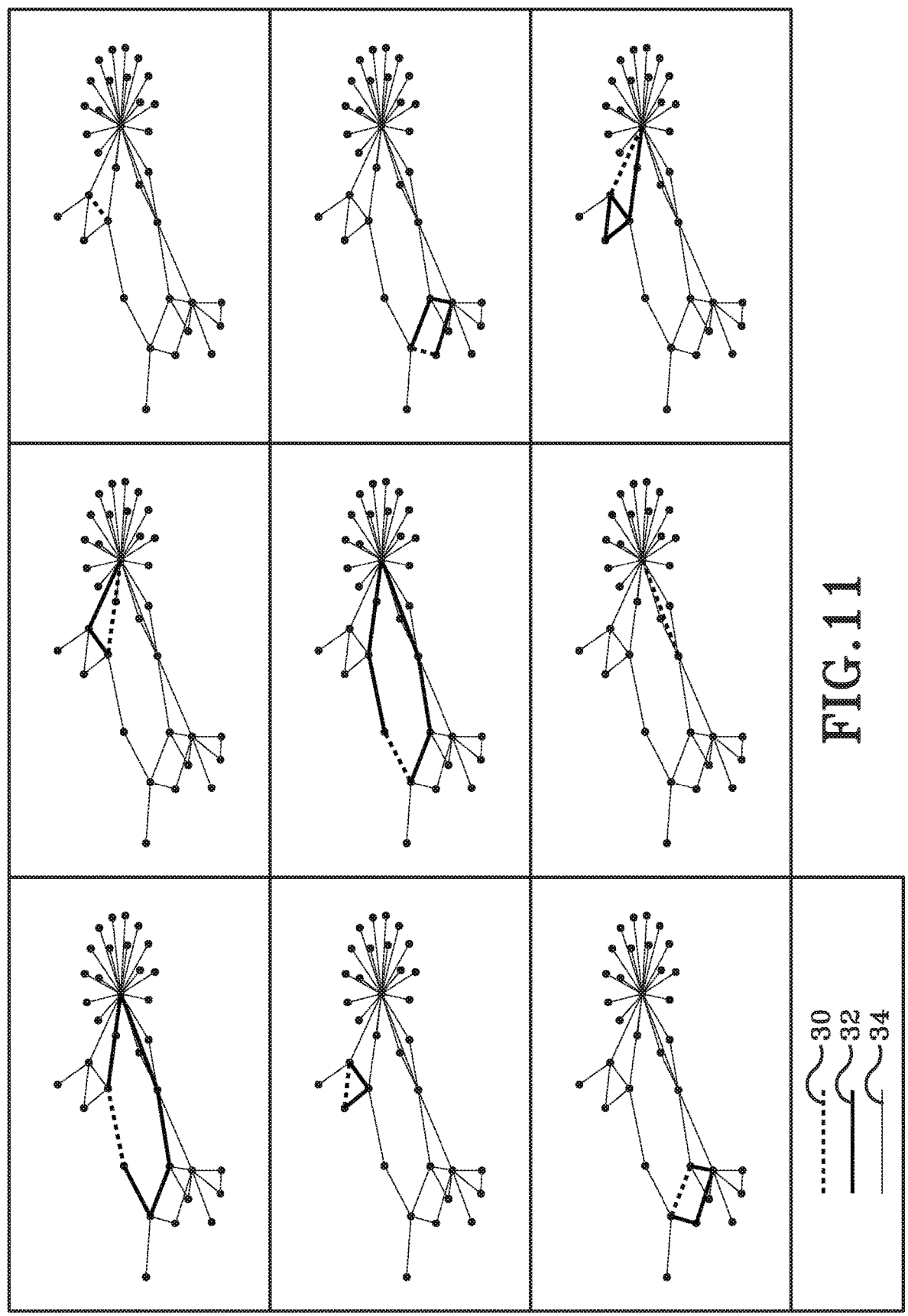
FIG. 11 (FIG. 11) is a series of plots formed from the execution of Equation 24.

A script generates model demand according to Equation 24, executes WR3LP, and plots the results as shown in FIG. 11. (NB. The script must be run multiple times with F set to different values for some of the results of one embodiment of the present disclosure.) Varying D in the script shows that the directed link from MV22.1 (one exemplary node) to MV22.8 (one exemplary node) becomes overwhelmed for D~4.8·10$^{-4}$, at which point all other links (including from MV22.8 to MV22.1) have utilization below about 0.1. Note that the links between MV22.1 (one exemplary node) to MV22.8 (one exemplary node) form an obvious bottleneck, corroborating the results.

FIG. 11 depicts a plurality of schematic view of some detours for F=1. Failed links are shown by the dotted line 30. The detour weight (aggregated over antiparallel links is shown by interpolating and thickness of edges. The thick line 32 corresponds to a (maximum) weight of 1. The thin lines 34 corresponds to a (maximum) weight of 0. The lower right panel provides a cursory node listing.

Some exemplary MATLAB code for the Wireless Constraint (wirelessconstraint.m) is:

```
N = size(E,1);
%% Check that gamma is well-formed
if numel(gamma) ~= N, error('E and gamma incompatible'); end
if numel(setxor(unique(gamma),1:max(gamma)))
    error('gamma must be onto 1:max(gamma)');
end
%% Virtualize to handle parallel edges
tv = topologyvirtualization(n,E,cap,d);
[~,sigma] = sort(tv.orig(1:N));
%% For each nontrivial pair (j,g), return relevant indices
ind = cell(1,n);
gamma_inv = cell(1,n);
for j = 1:n
    %% Form E_j and Gamma_j
    E_j = find(E(:,1)==j);
    Gamma_j = max(gamma(E_j));
    %% Form
    for g = 1:Gamma_j
        gamma_inv{j}{g} = E_j(gamma(E_j)==g);
        %% Check that capacity is constant on gamma_inv{j}{g}
        if numel(unique(cap(gamma_inv{j}{g}))) ~= 1
            error('cap and gamma incompatible');
        end
        %% Extract tuples for P2MP constraints
        n_gi = numel(gamma_inv{j}{g});
        if n_gi > 1
            ind{j}{g}= zeros(n_gi,3);
            for i = 1:n_gi
                ell = gamma_inv{j}{g}(i);
                ind{j}{g}(i,:) =[E(ell,:),sigma(ell)];
            end
        end
    end
end
%% Construct matrix and vector blocks for point-to-multipoint constraints
P2MP = sparse(0,(n^2)*N); % P2MP matrix (block)
p2mp = [ ]; % P2MP vector (block)
for j = 1:n
    for g = 1:numel(ind{j})
        if numel(ind{j}{g})
            % Recall that the rows of wc.ind{j}{g}are of the form
            % [j,t(ell),sigma(ell)]; add a row to P2MP accordingly
            P2MP = [P2MP;sparse(1,(n^2)*N)];
            for term = 1:size(ind{j}{g},1)
                tar_ell = ind{j}{g}(term,2);
                sigma_ell = ind{j}{g}(term,3);
                P2MP(end,n*N*(j-1)+N*(tar_ell-1)+sigma_ell) = d(j,tar_ell);
            end
            % Add a row to p2mp while exploiting local constancy of cap
            p2mp = [p2mp,cap(sigma_ell)];
        end
    end
end
%% Output
wc.n = tv.n;
wc.E = tv.E;
wc.cap = tv.cap;
wc.d = tv.d;
wc.ind = ind;
wc.P2MP = P2MP;
wc.p2mp = p2mp;
```

Some exemplary MATLAB code for the WR3LP is:

```
N = size(E,1);
%% R3LP Setup
r3s = R3LPSetup(n,E,cap,d,F,semiFlag,symFlag);
Aeq = r3s.Aeq;
A= r3s.A;
beq = r3s.beq;
b = r3s.b;
ub = r3s.ub;
lb = zeros(size(ub));
f = zeros(size(ub))';
f(end) = 1;
% Incorporate a small penalty proportional to the sum of routing terms to
% suppress spurious loops
Ipen = .5/((n^2)*N+N^2);
f(1:((n^2)*N+N^2)) = Ipen; % sum(f(1:((n^2)*N+N^2))) .5
%% Wireless/point-to-multipoint setup <diff>
we = wirelessconstraint(n,E,cap,d,gamma);
%% Amalgamation <diff>
A= [A;wc.P2MP,sparse(size(wc.P2MP,1),size(A,2)-size(wc.P2MP,2))];
b = [b;wc.p2mp];
%% Solution
x = linprog(f,A,b,Aeq,beq,lb,ub);
%% Output
dim = [(n^2)*N;N^2;N^2,N;1];
ind = cumsum([[1;dim(1:end-1)],dim],1);
wr3lps = x(ind(1,1):ind(1,2));
wr3lp.p = x(ind(2,1):ind(2,2));
```

```
wr3Ip.pi = x(ind(3,1):ind(3,2));
wr3Ip.lambda = x(ind(4,1):ind(4,2));
wr3Ip.mu = x(ind(5,1):ind(5,2)); % scalar: ind(5,1) = ind(5,2)
% Warn if mu > 1 according to Theorem 1 of [R3]
if wr3Ip.mu > 1, warning('mu >1: congestion may occur if a link fails'); end
```

Figure 12:
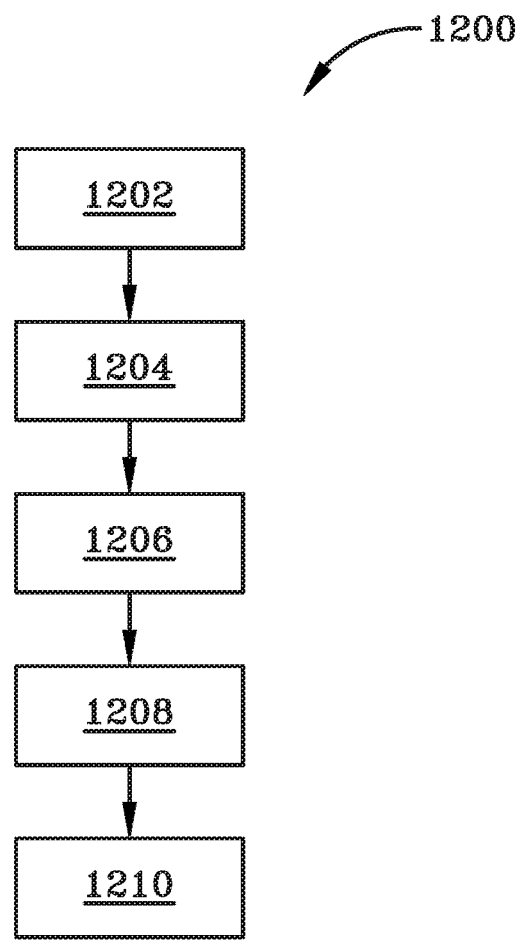
FIG. 12 (FIG. 12) is a flow chart depicting an exemplary method in accordance with one aspect of the present disclosure.

FIG. 12 is a flow chart depicting an exemplary method in accordance with one aspect of the present disclosure generally at 1200. Method 1200 includes defining P2MP groups that share a common capacity value, which is shown generally at 1202. Method 1200 may include creating a virtual demand for at least two links in the P2MP network, which is shown generally at 1204. Method 1200 may include precomputing a routing for an actual demand plus the virtual demand links in the P2MP network on P2MP network topology prior to detecting any failures in at least one of the links in the P2MP network in order to minimize a maximum link utilization over the P2MP network after an occurrence of link failures, which is shown generally at 1206. Method 1200 may further include detecting that one or more links in the P2MP network that have failed, which is shown generally at 1208. Method 1200 may further include converting, by a processor, the precomputed routing into a routing that does not traverse the detected one or more failed links in the P2MP network in response to detecting the one or more failed links in the P2MP network, and wherein the routing that does not traverse the detected one or more failed links, which is shown generally at 1210.

9. CONCLUSION

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields, that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method for rerouting traffic in a point-to-multipoint (P2MP) network, the method comprising:
   defining P2MP groups that share a common capacity value;
   creating a virtual demand for at least two links in the P2MP network;
   precomputing a routing for an actual demand plus the virtual demand of the at least two links in the P2MP network prior to detecting any failures in the at least two links in the P2MP network;
   detecting that one or more of the at least two links in the P2MP network have failed;
   converting, by a processor, the precomputed routing into a rerouting that does not traverse the detected one or more failed links in the P2MP network in response to detecting the one or more failed links in the P2MP network;
   representing the virtual demand for the links in the P2MP network as a set of linear constraints accounting for a wireless shared medium between two nodes in the P2MP network;
   minimizing a maximum link utilization ($\mu$) subject to the set of linear constraints, wherein one of the linear constraints accounts for the wireless shared medium;
   broadcasting information across the wireless shared medium from a first node to a plurality of receiving nodes, wherein the receiving nodes receive the information from the first node across the wireless shared medium;
   summing the data that the first node may send through the wireless shared medium; and
   decreasing a potential of the wireless shared medium in response to additional nodes joining the P2MP network.

2. The method of claim 1, further comprising:
   implementing programming duality on the set of linear constraints.

3. The method of claim 1, further comprising:
   addressing the constraint for the wireless shared medium during the step of precomputing the routing for the actual demand plus the virtual demand links in the P2MP network.

4. The method of claim 1, further comprising:
   removing loops in traffic routes in the P2MP network through a constraint that sums the data that the first node may send through the wireless shared medium.

5. The method of claim 1, further comprising:
   rerouting traffic on the detected one or more failed links to the routing that does not traverse the detected one or more failed links in the P2MP network.

6. The method of claim 1, further comprising:
   tracking and monitoring which link is associated with which node in the P2MP network; and
   listing which links belong to which nodes in the P2MP network.

7. The method of claim 1, further comprising:
   detecting that one or more of the failed links was a wireless link.

8. The method of claim 1, further comprising:
   identifying at least one additional node in the P2MP network that a first node communicates with over a certain frequency.

9. The method of claim 1, further comprising:
   multicasting information across wireless links in the P2MP network.

10. The method of claim 1, wherein the precomputing, the detecting one or more links in the P2MP network that have failed and the converting are performed in connection with handling traffic variations and topology variations;
    wherein the precomputing performed in connection with the handling of traffic variations and topology variations comprises precomputing the routing for a convex combination of multiple actual demands plus the virtual demand for the links in the P2MP network;
    wherein the precomputing, the detecting one or more links in the P2MP network that have failed and the converting are performed in connection with handling realistic failure scenarios and wherein the handling of realistic failure scenarios comprises adding constraints that encode knowledge that a single composite failure or a maintenance event simultaneously disables multiple links;

wherein the precomputing, the detecting one or more links in the P2MP network that have failed and the converting are performed in connection with handling prioritized traffic with different protection levels, wherein the precomputing performed in connection with the handling of prioritized traffic with different protection levels comprises precomputing the routing such that, as long as a number of link failures is less than or equal to a specified protection level associated with a traffic priority, all traffic with equal or higher priorities can be routed by the routing without having congestion; and wherein the precomputing, the detecting one or more links in the P2MP network that have failed and the converting are performed in connection with achieving tradeoff between performance under normal and failure conditions.

11. The method of claim 10, wherein the achieving tradeoff between performance under normal and failure conditions comprises bounding a ratio between a performance under a derived protection routing and a performance under an optimal routing under failures.

12. At least one non-transitory computer readable storage medium storing a computer program product that, when executed by a processor, implements operations to reroute traffic in a point-to-multipoint (P2MP) network, the computer program product comprising programming instructions of:

define P2MP groups that share a common capacity value;

create a virtual demand for at least two links in the P2MP network;

precompute a routing for an actual demand plus the virtual demand links in the P2MP network on P2MP network topology prior to detecting any failures in at least one of the links in the P2MP network in order to minimize a maximum link utilization over the P2MP network after an occurrence of link failures;

detect that one or more links in the P2MP network have failed;

convert, by the processor, the precomputed routing into a routing that does not traverse the detected one or more failed links in the P2MP network in response to detecting the one or more failed links in the P2MP network;

represent the virtual demand for the links in the P2MP network as a set of linear constraints accounting for a wireless shared medium between two nodes in the P2MP network;

minimize a maximum link utilization ($\mu$) subject to the set of linear constraints, wherein one of the linear constraints accounts for the wireless shared medium;

broadcast information across the shared medium from a first node to a plurality of receiving nodes, wherein the receiving nodes receive the information from the first node across the shared medium;

address the constraint for the wireless shared medium during the step of precomputing the routing for the actual demand plus the virtual demand links in the P2MP network;

sum the data that the first node may send through the wireless shared medium;

decrease a potential of the shared medium in response to additional nodes joining the P2MP network; and remove loops in traffic routes in the P2MP network through a constraint that sums the data that the first node may send through the wireless shared medium.

* * * * *